US012403762B2

(12) United States Patent
Keeney et al.

(10) Patent No.: US 12,403,762 B2
(45) Date of Patent: Sep. 2, 2025

(54) AXLE ASSEMBLY HAVING A SHIFT MECHANISM

(71) Applicant: ArvinMeritor Technology, LLC, Troy, MI (US)

(72) Inventors: Christopher Keeney, Troy, MI (US); Jeremy L. Cradit, Troy, MI (US); David M Zueski, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 394 days.

(21) Appl. No.: 18/297,782

(22) Filed: Apr. 10, 2023

(65) Prior Publication Data

US 2024/0336120 A1 Oct. 10, 2024

(51) Int. Cl.

| | | |
|---|---|---|
| *B60K 17/16* | (2006.01) | |
| *B60K 1/00* | (2006.01) | |
| *B60K 17/348* | (2006.01) | |
| *F16D 11/00* | (2006.01) | |
| *F16D 28/00* | (2006.01) | |
| *F16H 61/12* | (2010.01) | |

(Continued)

(52) U.S. Cl.
CPC ...... *B60K 17/165* (2013.01); *B60K 2001/001* (2013.01); *B60K 17/348* (2013.01); *F16D 2011/004* (2013.01); *F16D 2011/006* (2013.01); *F16D 28/00* (2013.01); *F16H 2061/1288* (2013.01); *F16H 63/3013* (2013.01); *F16H 63/304* (2013.01); *F16H 2063/3089* (2013.01); *F16H 2063/3093* (2013.01); *F16H 63/38* (2013.01)

(58) Field of Classification Search
CPC ... F16H 37/08–0826; F16H 2063/3013; F16H 2063/3093; F16H 63/304–2063/3066; F16H 63/38; F16H 2061/1268; F16H 2061/1288–1296; B60K 17/16; B60K 17/165; B60K 17/20; B60K 23/04; B60K 23/08; B60K 17/348; B60K 2023/085–0891; F16D 28/00; F16D 11/14; F16D 2011/004; F16D 2011/006
See application file for complete search history.

(56) References Cited

U.S. PATENT DOCUMENTS

| | | | |
|---|---|---|---|
| 1,981,236 A | | 11/1934 | Logue |
| RE26,953 E | * | 9/1970 | Warren ................. F16H 37/043 74/745 |
| 4,843,901 A | | 7/1989 | Peterson et al. |

(Continued)

FOREIGN PATENT DOCUMENTS

| | | | | |
|---|---|---|---|---|
| EP | 4067703 A1 | | 10/2022 | |
| EP | 4141291 A1 | * | 3/2023 | ............. F16H 61/28 |

OTHER PUBLICATIONS

Extended European search report dated Nov. 26, 2024 for related European Appln. No. 24165003.5; 27 pages.

(Continued)

*Primary Examiner* — James J Taylor, II
(74) *Attorney, Agent, or Firm* — Brooks Kushman PC

(57) ABSTRACT

An axle assembly having a shift mechanism. The shift mechanism includes an actuator that is configured to move the shift collar along the axis to selectively connect a member of a set of drive pinion gears to a drive pinion. A drive member is also provided that is configured to move the shift collar when actuated.

20 Claims, 19 Drawing Sheets

(51) Int. Cl.
*F16H 63/30* (2006.01)
*F16H 63/38* (2006.01)

(56) References Cited

U.S. PATENT DOCUMENTS

| | | |
|---|---|---|
| 6,176,146 B1 | 1/2001 | Ore |
| 7,798,937 B2 | 9/2010 | Gitt |
| 9,719,563 B2 | 8/2017 | Hirao |
| 10,183,577 B2* | 1/2019 | Pritchard ................ B60K 17/35 |
| 10,900,564 B2* | 1/2021 | Sinka ...................... F16H 63/30 |
| 10,989,288 B1 | 4/2021 | Ghatti et al. |
| 11,168,783 B1 | 11/2021 | Cradit et al. |
| 11,207,976 B2 | 12/2021 | Ghatti et al. |
| 11,209,072 B2 | 12/2021 | Ghatti et al. |
| 11,220,176 B1 | 1/2022 | Cradit et al. |
| 11,319,999 B2* | 5/2022 | Eitzinger ................ F16D 23/14 |
| 11,441,644 B2 | 9/2022 | Ghatti et al. |
| 11,441,657 B2 | 9/2022 | Chandrashekar et al. |
| 11,859,718 B1 | 1/2024 | Chandrashekar et al. |
| 11,959,548 B1* | 4/2024 | Martin ................... B60K 23/08 |
| 2003/0125150 A1* | 7/2003 | Tanzer ...................... F16H 3/54 |
| | | 475/311 |
| 2011/0111910 A1 | 5/2011 | Ideshio et al. |
| 2014/0311266 A1 | 10/2014 | Nakashima et al. |
| 2017/0059007 A1 | 3/2017 | Eo et al. |
| 2018/0015816 A1 | 1/2018 | Robinette et al. |
| 2018/0112770 A1 | 4/2018 | Hansson et al. |
| 2019/0054816 A1 | 2/2019 | Garcia et al. |
| 2019/0054817 A1 | 2/2019 | Garcia et al. |
| 2019/0054818 A1 | 2/2019 | Garcia et al. |
| 2020/0173494 A1 | 6/2020 | Smith et al. |
| 2020/0173531 A1 | 6/2020 | Smith |
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |
| 2022/0316590 A1 | 10/2022 | Chandrashekar et al. |

OTHER PUBLICATIONS

Partial European Search Report dated Sep. 5, 2024 for related European Appln. No. 24165003.5; 28 Pages.

* cited by examiner

AXLE ASSEMBLY HAVING A SHIFT MECHANISM

TECHNICAL FIELD

This relates to an axle assembly having a shift mechanism for actuating a shift collar.

BACKGROUND

An axle assembly having a clutch collar is disclosed in U.S. Pat. No. 9,719,563.

SUMMARY

In at least one embodiment an axle assembly is provided. The axle assembly includes a drive pinion, a transmission, and a shift mechanism. The drive pinion is rotatable about an axis. The transmission includes a set of drive pinion gears. The drive pinion gears are spaced apart from the drive pinion and are rotatable about the axis. The shift mechanism includes a shift collar, an actuator, a linkage, and a drive member. The shift collar is rotatable about the axis with the drive pinion. The shift collar is moveable along the axis with respect to the drive pinion. The actuator is configured to move the shift collar along the axis to selectively connect a member of the set of drive pinion gears to the drive pinion. The linkage is operatively connected to the actuator and the shift collar. The linkage is rotatable about an actuator axis. The linkage has a linkage gear. The drive member is rotatable about a drive member axis. The drive member has a drive member gear that has teeth that mesh with teeth of the linkage gear. The shift collar is moveable along the axis when the actuator rotates the linkage. The shift collar is moveable along the axis when the drive member is manually actuated to rotate the linkage.

The linkage gear may be a sector gear. The linkage gear may have teeth that extend away from the actuator axis.

The drive member may have a drive member engagement feature. The drive member engagement feature may be engageable with a tool that is configured to manually actuate the drive member. The drive member gear and the drive member engagement feature may be disposed at opposite ends of the drive member.

The shift mechanism may be received in a shift mechanism housing. The drive member may extend through a hole in the shift mechanism housing. The shift mechanism housing may define a bore. The bore may extend from the hole. A cap may be receivable in the bore to conceal the drive member.

In at least one embodiment an axle assembly is provided. The axle assembly includes a drive pinion, a transmission, and a shift mechanism. The drive pinion is rotatable about an axis. The transmission includes a set of drive pinion gears. The drive pinion gears are spaced apart from the drive pinion. The drive pinion gears are rotatable about the axis. The shift mechanism includes a shift collar, an actuator, a detent linkage, the linkage, and a drive member. The shift collar is rotatable about the axis with the drive pinion. The shift collar is moveable along the axis with respect to the drive pinion. The actuator is configured to move the shift collar along the axis to selectively connect a member of the set of drive pinion gears to the drive pinion. The detent linkage is coupled to the actuator. The detent linkage is rotatable about an actuator axis. The linkage is coupled to the detent linkage. The linkage is operatively connected to the shift collar. The linkage is rotatable about the actuator axis. The drive member is rotatable about the actuator axis with the detent linkage. The shift collar is moveable along the axis when the actuator rotates the linkage. The shift collar is moveable along the axis when the drive member is actuated to rotate the linkage.

The drive member may be received inside the detent linkage. The detent linkage may have a detent linkage spline. The drive member may have a drive member spline. The drive member spline may mate with the detent linkage spline.

The drive member may have a drive member engagement feature. The drive member engagement feature may be configured to be engaged by a tool. The tool may be configured to manually actuate the drive member. The drive member spline and the drive member engagement feature may be disposed at opposite ends of the drive member.

A sensor may be coupled to the drive member. The sensor may generate a signal indicative of a rotational position of the drive member. The sensor may be mounted to the shift mechanism housing. The sensor may be disposed outside the shift mechanism housing.

An adapter may extend from the sensor to the drive member. The adapter may be received inside the drive member. The sensor may have a shaft. The shaft may be received inside the adapter.

The detent linkage may be positioned along the actuator axis closer to the actuator than the linkage is positioned to the actuator. The detent linkage may define a detent linkage hole. The detent linkage hole may receive the linkage. The drive member may define a drive member hole. The drive member hole may receive the linkage. The drive member may have an indicator mark. The indicator mark may provide a visual indication of a position of the shift collar. The visual indication of the position of the shift collar may be visible from outside the shift mechanism housing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
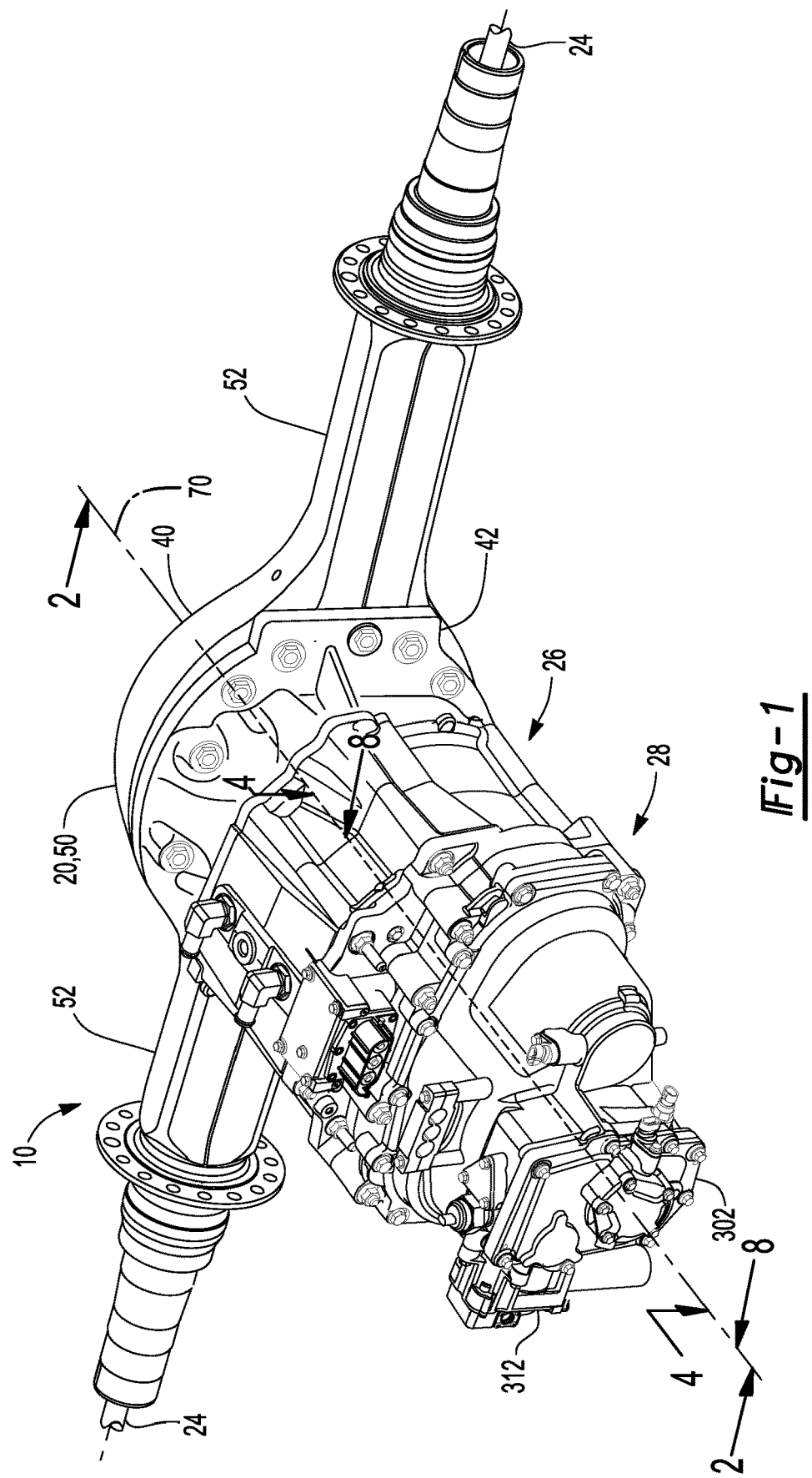
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 is configured to provide torque to one or more traction wheel assemblies that may include a tire mounted on a wheel. The wheel may be mounted to a wheel hub that may be rotatable about a wheel axis.

Figure 2:
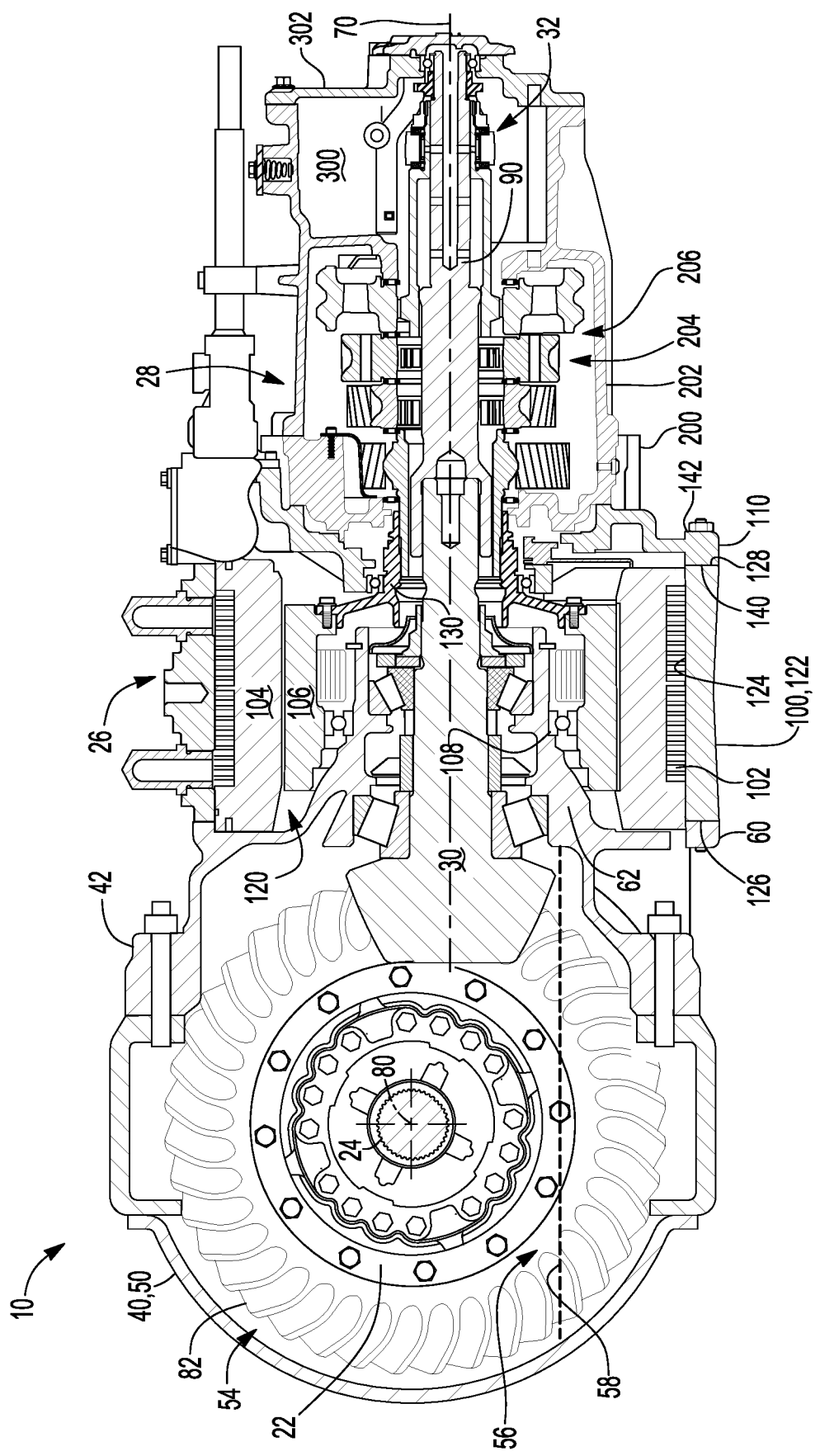
FIG. 2 is a section view of the axle assembly along section line 2-2.

One or more axle assemblies may be provided with the vehicle. A single axle assembly is shown in FIGS. 1 and 2. The axle assembly 10 includes a housing assembly 20, a differential assembly 22, at least one axle shaft 24, an electric motor module 26, a transmission module 28, a drive pinion 30, a shift mechanism 32, or combinations thereof.

Housing Assembly

Referring to FIG. 1, the housing assembly 20 receives various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

The center portion 50 is disposed proximate the center of the axle housing 40. As is best shown in FIG. 2, the center portion 50 may define a cavity 54 that may at least partially receive the differential assembly 22. A lower region of the center portion 50 may at least partially define a sump portion 56 that may contain or collect lubricant 58. Lubricant 58 in the sump portion 56 may be splashed by a ring gear 82 of the differential assembly 22 and distributed to lubricate various components that may or may not be received in the housing assembly 20. For instance, some splashed lubricant 58 may lubricate components that are received in the cavity 54 like the differential assembly 22, bearing assemblies that rotatably support the differential assembly 22, a drive pinion 30, and so on, while some splashed lubricant 58 may be routed out of the cavity 54 to lubricate components located outside of the housing assembly 20, such as components associated with the transmission module 28, the shift mechanism 32, or both.

Referring to FIG. 1, one or more arm portions 52 may extend from the center portion 50. For instance, two arm portions 52 may extend in opposite directions from the center portion 50 and away from the differential assembly 22. The arm portions 52 may have similar configurations. For example, the arm portions 52 may each have a hollow tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring primarily to FIG. 2, the differential carrier 42 is configured to support the differential assembly 22. For example, the differential carrier 42 may include one or more bearing supports that may support a bearing like a roller bearing assembly that may rotatably support the differential assembly 22. The differential carrier 42 may be mounted to the center portion 50 of the axle housing 40. The differential carrier 42 may also facilitate mounting of the electric motor module 26. In at least one configuration, the differential carrier 42 may include a mounting flange 60 and/or a bearing support wall 62.

The mounting flange 60 may facilitate mounting of the electric motor module 26. As an example, the mounting flange 60 may be configured as a ring that may extend around an axis 70. In at least one configuration, the mounting flange 60 may include a set of fastener holes that may be configured to receive fasteners that may secure the electric motor module 26 to the mounting flange 60.

The bearing support wall 62 may support bearings that may rotatably support other components of the axle assembly 10. For example, the bearing support wall 62 may support a bearing that may rotatably support the drive pinion 30, a bearing that may rotatably support a rotor of the electric motor module 26, or both. The bearing support wall 62 may extend in an axial direction away from the axle housing 40 and may extend around the axis 70. The bearing support wall 62 may define a hole that may extend along or around the axis 70 and receive the drive pinion 30 and the bearings that rotatably support the drive pinion 30. The bearing support wall 62 may be integrally formed with the differential carrier 42 or may be a separate component that is fastened to the differential carrier 42.

Differential Assembly, Drive Pinion, and Axle Shafts

Referring to FIG. 2, the differential assembly 22 is rotatable about a differential axis 80 and is configured to transmit torque to the axle shafts 24 and wheels. The differential assembly 22 is operatively connected to the axle shafts 24 and may permit the axle shafts 24 to rotate at different rotational speeds in a manner known by those skilled in the art. The differential assembly 22 may be at least partially received in the center portion 50 of the housing assembly 20. The differential assembly 22 may have a ring gear 82 that may have teeth that mate or mesh with the teeth of a gear portion of the drive pinion 30. Accordingly, the differential assembly 22 may receive torque from the drive pinion 30 via the ring gear 82 and transmit torque to the axle shafts 24.

The drive pinion 30 may operatively connect the transmission module 28 to the differential assembly 22. As such, the drive pinion 30 may transmit torque between the differential assembly 22 and the transmission module 28. In at least one configuration, the drive pinion 30 may be rotatable about the axis 70 and may be rotatably supported inside another component, such as the bearing support wall 62.

Figure 6:
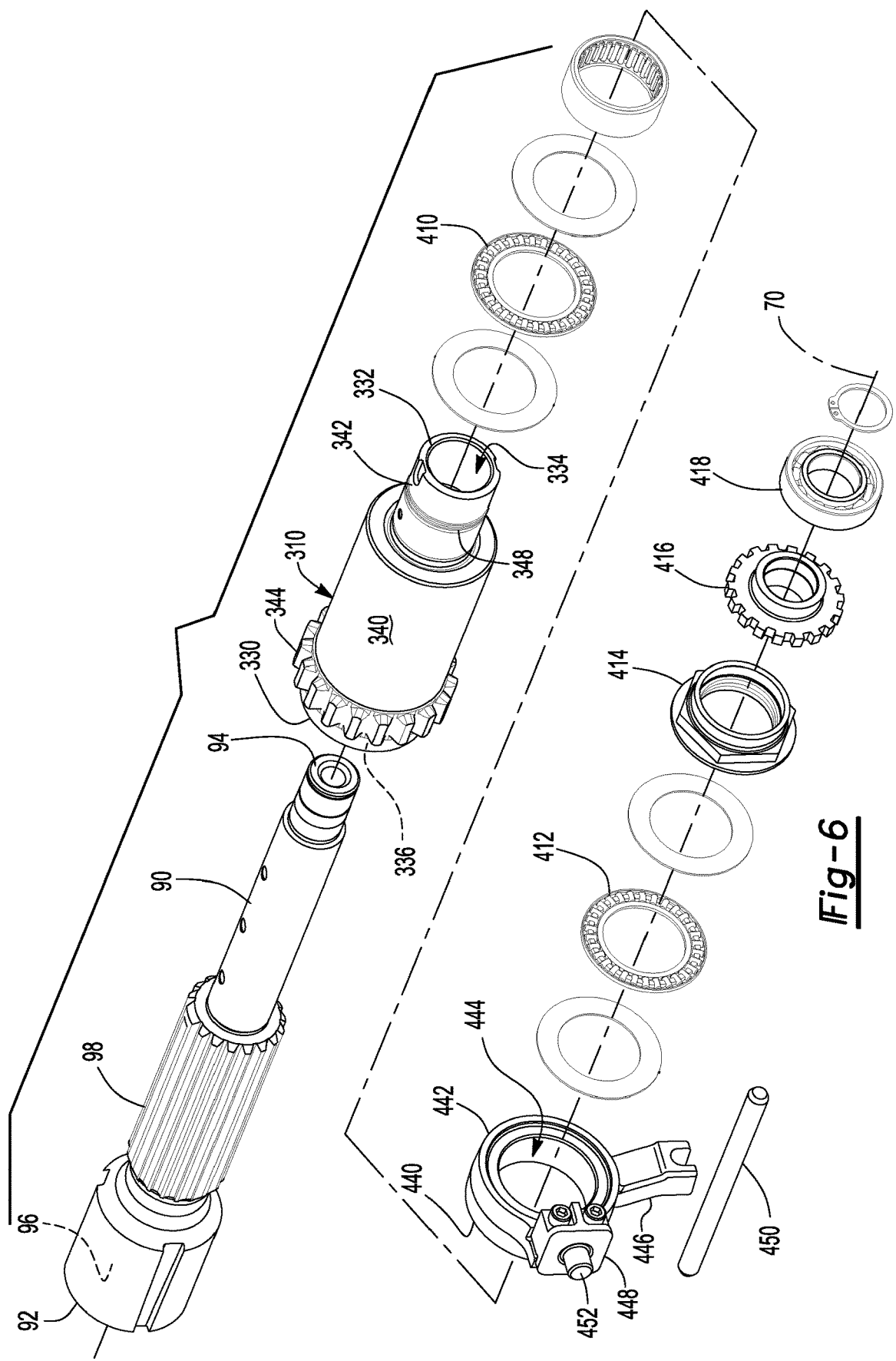
FIG. 6 is an exploded view of a portion of the shift mechanism shown in FIG. 5.
Figure 7:
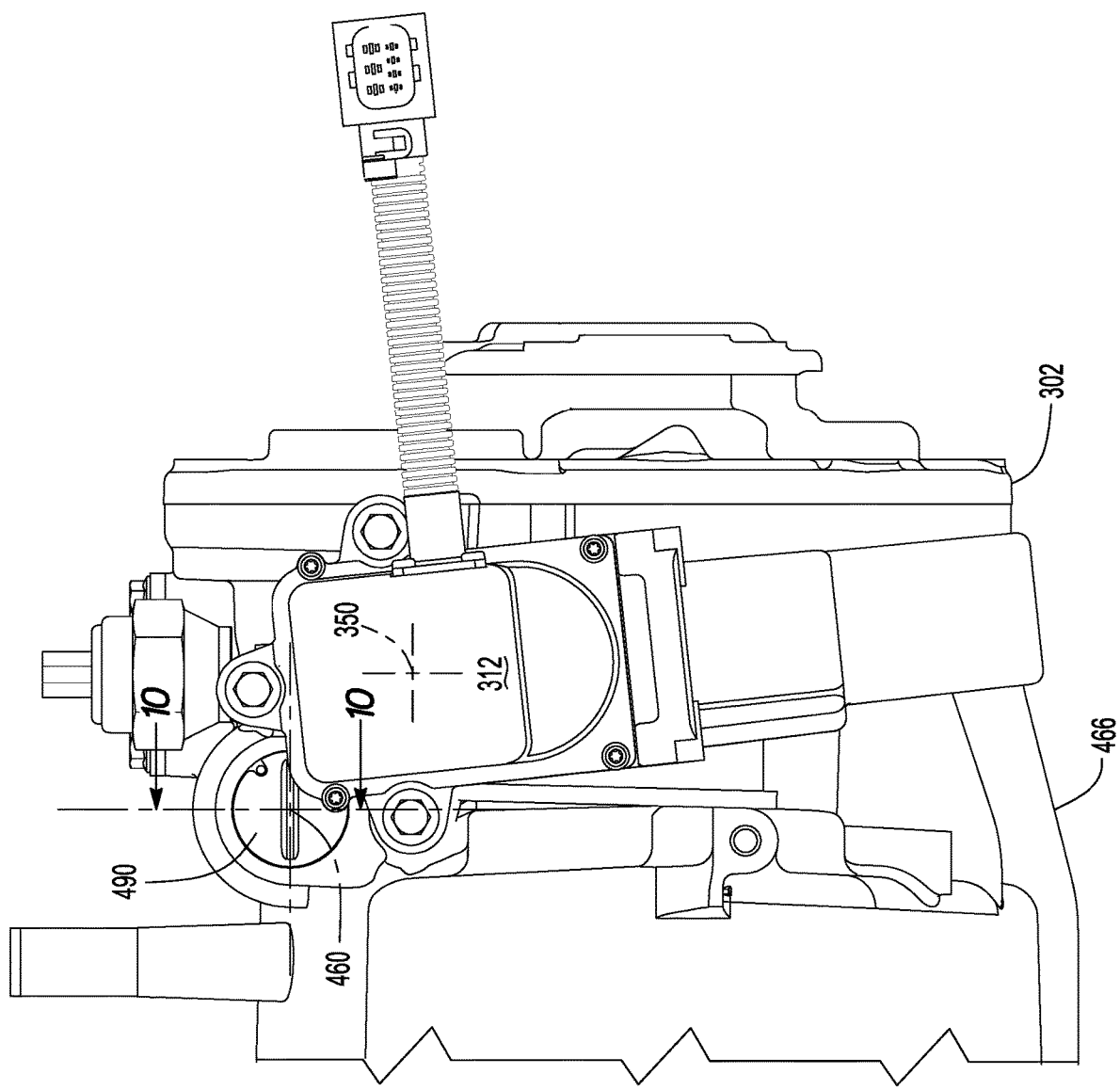
FIG. 7 is a side view of a portion of the axle assembly.
Figure 8:
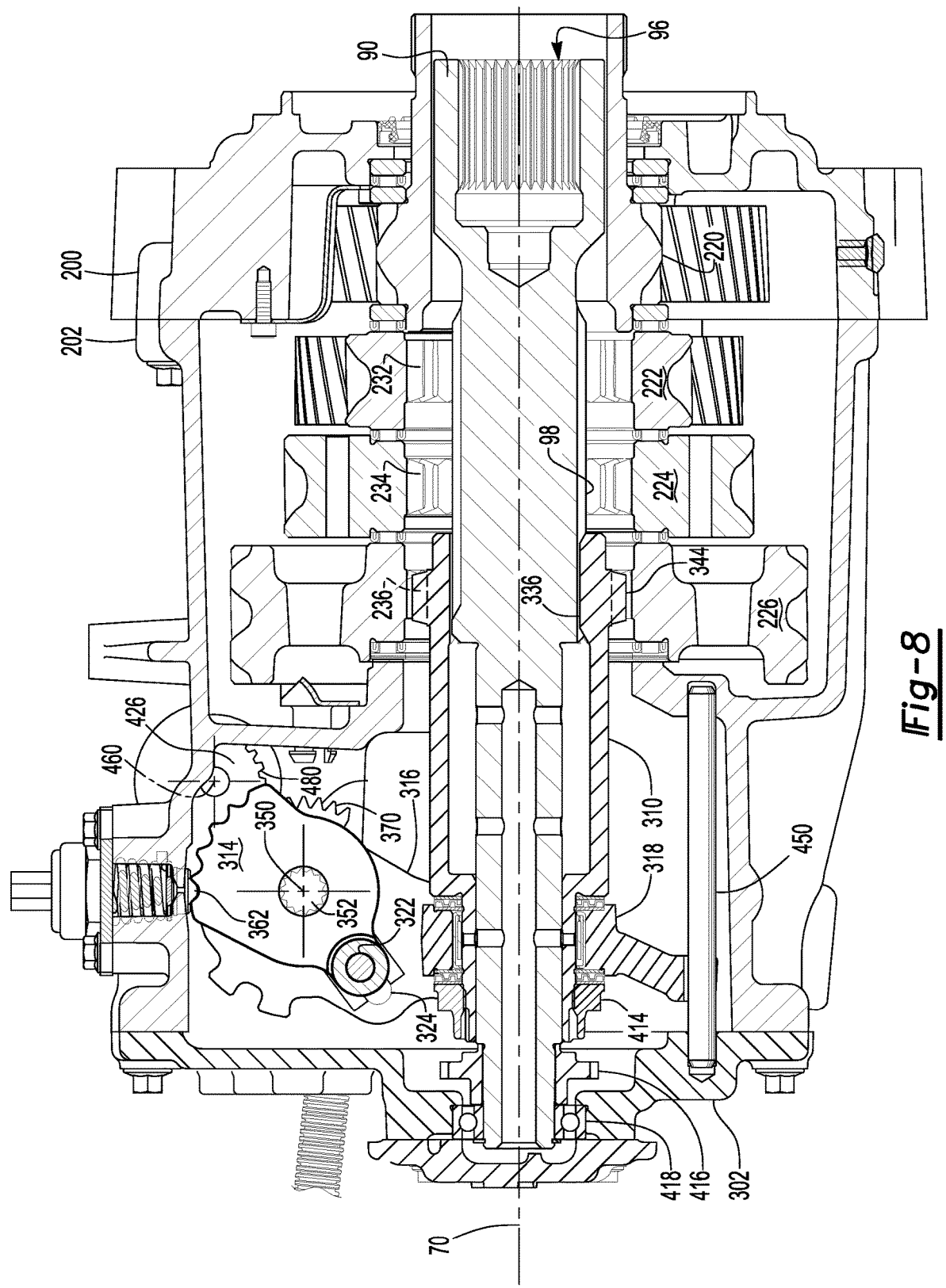
FIG. 8 is a section view of a portion of the axle assembly along section line 8-8.

Referring primarily to FIGS. 2 and 6, the drive pinion 30 may optionally include or may be coupled to a drive pinion extension 90. The drive pinion extension 90 may effectively increase the axial length of the drive pinion 30. In at least one configuration, the drive pinion extension 90 may be a separate component from the drive pinion 30 and may be coupled to the drive pinion 30 such that the drive pinion extension 90 is rotatable about the axis 70 with the drive pinion 30. In addition, the drive pinion extension 90 may be fixedly positioned with respect to the drive pinion 30 such that the drive pinion extension 90 may not move along the axis 70 with respect to the drive pinion 30. It is also contemplated that the drive pinion extension 90 may be integrally formed with the drive pinion 30. For convenience in reference, the term "drive pinion 30" is used herein to refer to the drive pinion 30 with or without the drive pinion extension 90.

In at least one configuration, the drive pinion extension 90 may extend from a first end 92 to a second end 94 and may include a socket 96 and the spline 98. The socket 96 may extend from the first end 92 and may receive the drive pinion 30. The second end 94 may be received inside and may be rotatably supported by a support bearing 418. The spline 98, if provided, may facilitate coupling of the drive pinion extension 90 to a shift collar 310 that may be moveable along the axis 70 as will be discussed in more detail below.

Referring to FIG. 1, the axle shafts 24 are configured to transmit torque between the differential assembly 22 and corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26, which may also be referred to as an electric motor, is configured to provide propulsion torque. The electric motor module 26 may be mounted to the differential carrier 42 and may be operatively connectable to the differential assembly 22. For instance, the electric motor module 26 may configured to provide torque to the differential assembly 22 via the transmission module 28 and the drive pinion 30 as will be discussed in more detail below. The electric motor module 26 may be primarily or completely disposed outside the differential carrier 42. In addition, the electric motor module 26 may be axially positioned between the axle housing 40 and the transmission module 28. In at least one configuration, the electric motor module 26 may include a motor housing 100, a coolant jacket 102, a stator 104, a rotor 106, and at least one rotor bearing assembly 108. The electric motor module 26 may also include a motor cover 110.

The motor housing 100 may extend between the differential carrier 42 and the motor cover 110. The motor housing 100 may be mounted to the differential carrier 42 and the motor cover 110. For example, the motor housing 100 may extend from the mounting flange 60 of the differential carrier 42 to the motor cover 110. The motor housing 100 may extend around the axis 70 and may define a motor housing cavity 120. The motor housing cavity 120 may be disposed inside the motor housing 100 and may have a generally cylindrical configuration. The bearing support wall 62 of the differential carrier 42 may be located inside the motor housing cavity 120. Moreover, the motor housing 100 may extend continuously around and may be spaced apart from the bearing support wall 62. In at least one configuration, the motor housing 100 may have an exterior side 122, an interior side 124, a first end surface 126, and a second end surface 128.

The exterior side 122 faces away from the axis 70 and may define an exterior or outside surface of the motor housing 100.

The interior side 124 is disposed opposite the exterior side 122 and may face toward the axis 70. The interior side 124 may be disposed at a substantially constant radial distance from the axis 70 in one or more configurations.

The first end surface 126 is disposed at an end of the motor housing 100 that may face toward the differential carrier 42. For instance, the first end surface 126 may be disposed adjacent to the mounting flange 60 of the differential carrier 42 and may engage or contact the mounting flange 60. The first end surface 126 may extend between the exterior side 122 and the interior side 124.

The second end surface 128 may be disposed opposite the first end surface 126. As such, the second end surface 128 may be disposed at an end of the motor housing 100 that may face toward the motor cover 110 and may engage or contact the motor cover 110.

The coolant jacket 102 facilitates cooling or heat removal, such cooling of the stator 104. The coolant jacket 102 may be received in the motor housing cavity 120 of the motor housing 100 and may engage the interior side 124 of the motor housing 100. The coolant jacket 102 may extend axially (e.g., in a direction along the axis 70) between the differential carrier 42 and the motor cover 110. For example, the coolant jacket 102 may extend axially from the differential carrier 42 to the motor cover 110. In addition, the coolant jacket 102 may extend around the axis 70 and around the stator 104. Accordingly, the stator 104 may be at least partially received in and may be encircled by the coolant jacket 102. The coolant jacket 102 may extend in a radial direction from the stator 104 to the interior side 124 of the motor housing 100. In at least one configuration, the coolant jacket 102 may include a plurality of channels through which coolant may flow.

The stator 104 is received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 extends around and is rotatable about an axis, such as axis 70. In addition, the rotor 106 may extend around and may be supported by the bearing support wall 62. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104.

One or more rotor bearing assemblies 108 rotatably support the rotor 106. For example, a rotor bearing assembly 108 may extend around and receive the bearing support wall 62 of the differential carrier 42 and may be received inside of the rotor 106. The rotor 106 may be operatively connected to the drive pinion 30. For instance, a coupling such as a rotor output flange 130 may operatively connect the rotor 106 to the transmission module 28, which in turn may be operatively connectable to the drive pinion 30.

The motor cover 110 may be mounted to the motor housing 100 and may be disposed opposite the axle housing 40 and the differential carrier 42. For example, the motor cover 110 may be mounted to the second end surface 128 of the motor housing 100. The motor cover 110 may be spaced apart from and may not engage the differential carrier 42. The motor cover 110 may be provided in various configurations. In at least one configuration, the motor cover 110 may include a first side 140 and a second side 142. The first side 140 may face toward and may engage the motor housing 100. The second side 142 may be disposed opposite the first side 140. The second side 142 may face away from the motor housing 100. The motor cover 110 may also include a motor cover opening through which the drive pinion 30 may extend. The motor cover 110 may be integrated with the transmission module 28 or may be a separate component.

Transmission Module

Figure 4:
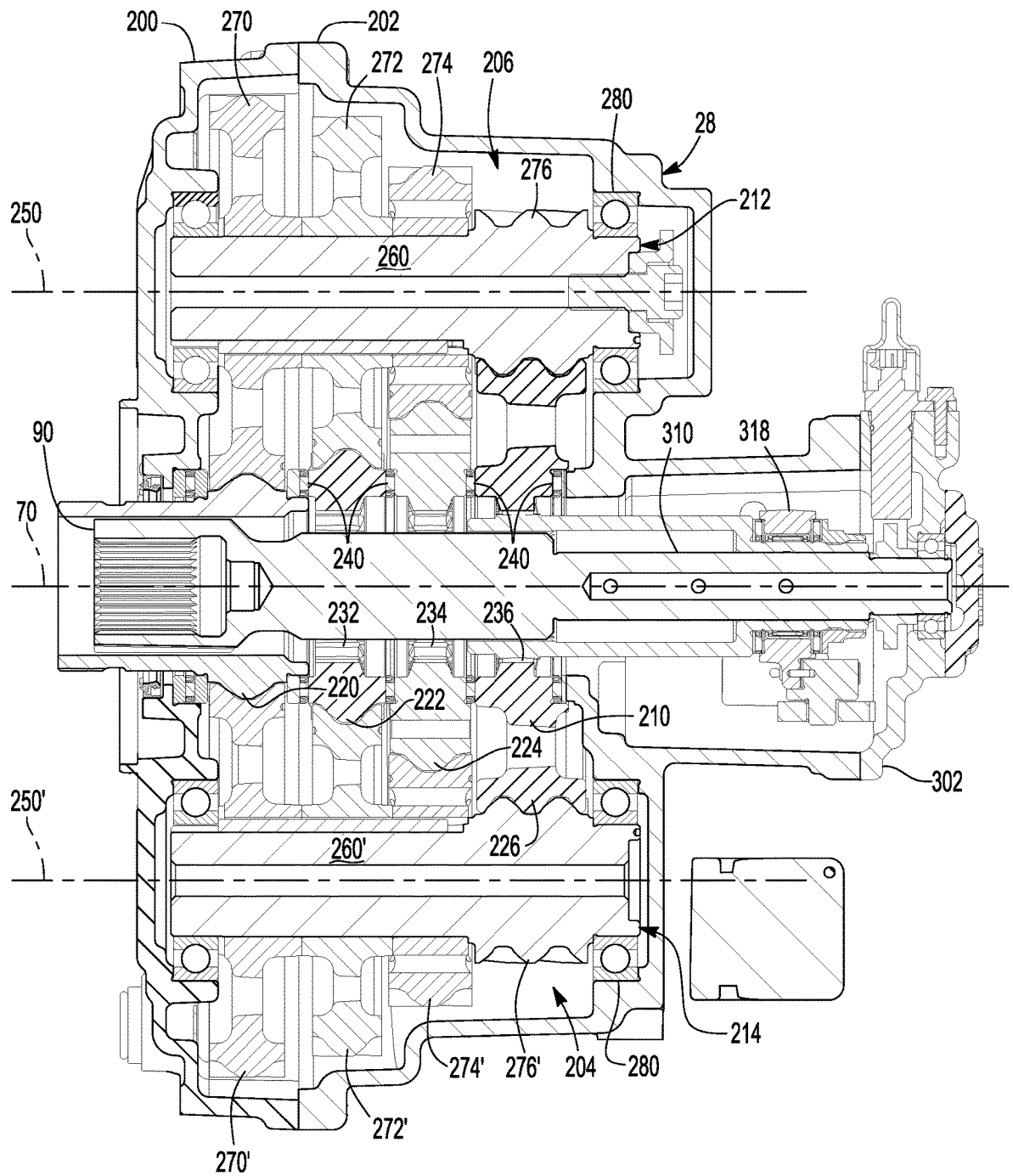
FIG. 4 is a section view of a portion of the axle assembly along section line 4-4 with the electric motor module and drive pinion omitted for clarity.

Referring to FIGS. 2 and 4, the transmission module 28 is configured to transmit torque between the electric motor module 26 and the differential assembly 22. As such, the transmission module 28 may be operatively connectable to the electric motor module 26 and the differential assembly 22. In at least one configuration, the transmission module 28 may include a transmission housing. The transmission housing may include one or more individual housings, such as a first transmission housing 200, a second transmission housing 202. The transmission module 28 may also include a transmission 204. The first transmission housing 200 and the second transmission housing 202 may cooperate to define a transmission housing cavity 206 that may receive the transmission 204.

The first transmission housing 200 may be mounted to the electric motor module 26. For instance, the first transmission housing 200 may be mounted to the second side 142 of the motor cover 110. As such, the motor cover 110 may separate the first transmission housing 200 from the motor housing 100.

The second transmission housing 202 may be mounted to the first transmission housing 200. For instance, the first transmission housing 200 may be mounted to and may engage or contact a side of the first transmission housing 200 that may face away from the motor cover 110. As such, the first transmission housing 200 may separate the second transmission housing 202 from the motor cover 110.

The transmission 204 may be operatively connected to the electric motor. In at least one configuration, the transmission 204 may be configured as a countershaft transmission that includes a set of drive pinion gears 210, a first countershaft gear set 212, and optionally a second countershaft gear set 214.

The set of drive pinion gears 210 is received in the transmission housing cavity 206 of the transmission housing and may be arranged along the axis 70 between the first transmission housing 200 and the second transmission housing 202. The set of drive pinion gears 210 may include a plurality of gears, some or all of which may be selectively coupled to the drive pinion 30. The set of drive pinion gears 210 is spaced apart from the drive pinion 30 and is rotatable about the axis 70. The gears may be independently rotatable with respect to each other. In the configuration shown, the set of drive pinion gears 210 includes a first gear 220, a second gear 222, a third gear 224, and a fourth gear 226; however, it is to be understood that a greater or lesser number of gears may be provided.

The first gear 220 extends around the axis 70 and may be disposed proximate the first transmission housing 200. In at least one configuration, the first gear 220 may have a through hole that may receive the drive pinion 30, an extension of the drive pinion 30 like the drive pinion extension 90, or both. The first gear 220 may have a plurality of teeth that may be arranged around and may extend away from the axis 70. The teeth of the first gear 220 may contact and may mate or mesh with teeth of a first countershaft gear that may be provided with the first countershaft gear set 212 and the second countershaft gear set 214 as will be discussed in more detail below. The first gear 220 may be operatively connected to the rotor 106 of the electric motor module 26 such that the rotor 106 and the first gear 220 are rotatable together about the axis 70. For example, the first gear 220 may be fixedly positioned with respect to the rotor 106 or fixedly coupled to the rotor 106 such that the first gear 220 is not rotatable about the axis 70 with respect to the rotor 106. It is contemplated that the first gear 220 may be fixedly mounted to or integrally formed with the rotor output flange 130. As such, the first gear 220 may be continuously connected to the rotor 106 such that the first gear 220 and the rotor 106 may be rotatable together about the axis 70 but may not be rotatable with respect to each other. It is also contemplated that the first gear 220 may be selectively coupled to the drive pinion 30 or drive pinion extension 90, such as with a shift collar. In addition, the first gear 220 may be decoupled from the drive pinion 30 and may be rotatable with respect to the drive pinion 30. As such, a clutch or shift collar 310 may not connect the first gear 220 to the drive pinion 30 or the drive pinion extension 90. The drive pinion extension 90, if provided, may be received inside the first gear 220 and may be spaced apart from the first gear 220. In at least one configuration, the first gear 220 may be axially positioned along the axis 70 between the second gear 222 and the electric motor module 26.

The second gear 222 extends around the axis 70. In at least one configuration, the second gear 222 may have a through hole that may receive the drive pinion 30, the drive pinion extension 90, or both. The second gear 222 may have a plurality of teeth that may be arranged around and may extend away from the axis 70. The teeth of the second gear 222 may contact and may mate or mesh with teeth of a second countershaft gear that may be provided with the first countershaft gear set 212 and the second countershaft gear set 214 as will be discussed in more detail below. As is best shown in FIG. 4, the second gear 222 may also have inner gear teeth 232 that may extend toward the axis 70 and may be received in the through hole. The second gear 222 may have a different diameter than the first gear 220. For example, the second gear 222 may have a larger diameter than the first gear 220. In at least one configuration, the second gear 222 may be axially positioned along the axis 70 between the first gear 220 and the third gear 224. The drive pinion 30 or drive pinion extension 90, if provided, may be received inside the second gear 222 and may be spaced apart from the second gear 222 in one or more configurations.

The third gear 224 extends around the axis 70. In at least one configuration, the third gear 224 may have a through hole that may receive the drive pinion 30, the drive pinion extension 90, or both. The third gear 224 may have a plurality of teeth that may be arranged around and may extend away from the axis 70. The teeth of the third gear 224 may contact and may mate or mesh with teeth of a third countershaft gear that may be provided with the first countershaft gear set 212 and the second countershaft gear set 214 as will be discussed in more detail below. As is best shown in FIG. 4, the third gear 224 may also have inner gear teeth 234 that may extend toward the axis 70 and may be received in the through hole. The third gear 224 may have a different diameter than the first gear 220 and the second gear 222. For example, the third gear 224 may have a larger diameter than the first gear 220 and the second gear 222. In at least one configuration, the third gear 224 be axially positioned along the axis 70 between the second gear 222 and the fourth gear 226. The drive pinion 30 or drive pinion extension 90, if provided, may be received inside the third gear 224 and may be spaced apart from the third gear 224 in one or more configurations.

The fourth gear 226 extends around the axis 70. In at least one configuration, the fourth gear 226 may have a through hole that may receive the drive pinion 30, the drive pinion extension 90, or both. The fourth gear 226 may have a plurality of teeth that may be arranged around and may extend away from the axis 70. The teeth of the fourth gear 226 may contact and may mate or mesh with teeth of a fourth countershaft gear that may be provided with the first countershaft gear set 212 and the second countershaft gear set 214 as will be discussed in more detail below. As is best shown in FIG. 4, the fourth gear 226 may also have inner gear teeth 236 that may extend toward the axis 70 and may be received in the through hole. The fourth gear 226 may have a different diameter than the first gear 220, the second gear 222, and the third gear 224, such as a larger diameter. In at least one configuration, the fourth gear 226 be axially positioned along the axis 70 further from the electric motor module 26 than the first gear 220, the second gear 222, and the third gear 224. As such, the fourth gear 226 may be axially positioned proximate or adjacent to a side of the second transmission housing 202 that is disposed opposite the first transmission housing 200. The drive pinion 30 or drive pinion extension 90 may be received inside the fourth gear 226 and may be spaced apart from the fourth gear 226 in one or more configurations.

Referring to FIG. 4, thrust bearings 240 may optionally be provided between members of the set of drive pinion gears 210, between the first transmission housing 200 and the set of drive pinion gears 210, between the second transmission housing 202 and the set of drive pinion gears 210, or combinations thereof.

The first countershaft gear set 212 is received in the transmission housing cavity 206 and may be in meshing engagement with the set of drive pinion gears 210. The first countershaft gear set 212 may be rotatable about a first countershaft axis 250. The first countershaft axis 250 may be disposed parallel or substantially parallel to the axis 70 in one or more embodiments. The term "substantially parallel" as used herein means the same as or very close to parallel and includes features or axes that are within ±3° of being parallel each other. The first countershaft gear set 212 may include a first countershaft 260 and a plurality of gears. In the configuration shown, the plurality of gears of the first countershaft gear set 212 include a first countershaft gear 270, a second countershaft gear 272, a third countershaft gear 274, and a fourth countershaft gear 276; however, it is contemplated that a greater number of countershaft gears or a lesser number of countershaft gears may be provided.

The first countershaft 260 is rotatable about the first countershaft axis 250. For instance, the first countershaft 260 may be rotatably supported on the first transmission housing 200 and the second transmission housing 202 by corresponding bearing assemblies 280. For example, first and second bearing assemblies 280 may be located near opposing first and second ends the first countershaft 260, respectively. The first countershaft 260 may support and be rotatable with the first countershaft gear 270, the second countershaft gear 272, the third countershaft gear 274, and the fourth countershaft gear 276.

The first countershaft gear 270 is fixedly disposed on the first countershaft 260 or fixedly mounted to the first countershaft 260. As such, the first countershaft gear 270 may rotate about the first countershaft axis 250 with the first countershaft 260 and may not be rotatable with respect to the first countershaft 260. For example, the first countershaft gear 270 may have a hole that may receive the first countershaft 260 and may be fixedly coupled to the first countershaft 260. The first countershaft gear 270 may extend around the first countershaft axis 250 and may have a plurality of teeth that may be arranged around and may extend away from the first countershaft axis 250. The teeth of the first countershaft gear 270 may contact and may mate or mesh with the teeth of the first gear 220. In at least one configuration, the first countershaft gear 270 may be axially positioned along the first countershaft axis 250 between the first transmission housing 200 and the second countershaft gear 272 of the first countershaft gear set 212.

The second countershaft gear 272 is fixedly disposed on the first countershaft 260 or fixedly mounted to the first countershaft 260. As such, the second countershaft gear 272 may rotate about the first countershaft axis 250 with the first countershaft 260 and may not be rotatable with respect to the first countershaft 260. For example, the second countershaft gear 272 may have a hole that may receive the first countershaft 260 and may be fixedly coupled to the first countershaft 260. The second countershaft gear 272 may extend around the first countershaft axis 250 and may have a plurality of teeth that may be arranged around and may extend away from the first countershaft axis 250. The teeth of the second countershaft gear 272 may contact and may mate or mesh with the teeth of the second gear 222. The second countershaft gear 272 may have a different diameter than the first countershaft gear 270 and the third countershaft gear 274. In at least one configuration, the second countershaft gear 272 may be axially positioned along the first countershaft axis 250 between the first countershaft gear 270 of the first countershaft gear set 212 and the third countershaft gear 274 of the first countershaft gear set 212.

The third countershaft gear 274 is fixedly disposed on the first countershaft 260 or fixedly mounted to the first countershaft 260. As such, the third countershaft gear 274 may rotate about the first countershaft axis 250 with the first countershaft 260 and may not be rotatable with respect to the first countershaft 260. For example, the third countershaft gear 274 may have a hole that may receive the first countershaft 260 and may be fixedly coupled to the first countershaft 260. The third countershaft gear 274 may extend around the first countershaft axis 250 and may have a plurality of teeth that may be arranged around and may extend away from the first countershaft axis 250. The teeth of the third countershaft gear 274 may contact and may mate or mesh with the teeth of the third gear 224. The third countershaft gear 274 may have a different diameter than the first countershaft gear 270 and the second countershaft gear 272. In at least one configuration, the third countershaft gear 274 may be axially positioned along the first countershaft axis 250 between the second countershaft gear 272 of the first countershaft gear set 212 and the fourth countershaft gear 276 of the first countershaft gear set 212.

The fourth countershaft gear 276 is fixedly disposed on the first countershaft 260 or fixedly mounted to the first countershaft 260. As such, the fourth countershaft gear 276 may rotate about the first countershaft axis 250 with the first countershaft 260 and may not be rotatable with respect to the first countershaft 260. For example, the fourth countershaft gear 276 may have a hole that may receive the first countershaft 260 and may be fixedly coupled to the first countershaft 260 or may be integrally formed with the first countershaft 260. The fourth countershaft gear 276 may extend around the first countershaft axis 250 and may have a plurality of teeth that may be arranged around and may extend away from the first countershaft axis 250. The teeth of the fourth countershaft gear 276 may contact and may mate or mesh with the teeth of the fourth gear 226. The fourth countershaft gear 276 may have a different diameter than the first countershaft gear 270, the second countershaft gear 272, and the third countershaft gear 274. In at least one configuration, the fourth countershaft gear 276 may be axially positioned along the first countershaft axis 250 further from the electric motor module 26 than the third countershaft gear 274 of the first countershaft gear set 212.

The second countershaft gear set 214, if provided, is received in the transmission housing cavity 206 and may be rotatable about a second countershaft axis 250'. The second countershaft axis 250' may be disposed parallel or substantially parallel to the axis 70 and the first countershaft axis 250 in one or more embodiments. The second countershaft gear set 214 may generally be disposed on an opposite side of the axis 70 from the first countershaft gear set 212 or may be disposed such that the first countershaft axis 250 and the second countershaft axis 250' may be disposed at a common radial distance from the axis 70. The first and second countershaft gear sets 212, 214 may be positioned at any suitable rotational angle or position about the axis 70.

The second countershaft gear set 214 may have the same or substantially the same configuration as the first countershaft gear set 212. For example, the second countershaft gear set 214 may include a second countershaft 260' that may be analogous to or may have the same structure as the first countershaft 260. In addition, the second countershaft gear set 214 may include a plurality of gears that are rotatable with the second countershaft 260'. In the configuration shown, the plurality of gears of the second countershaft gear set 214 include a first countershaft gear 270', a second countershaft gear 272', a third countershaft gear 274', and a fourth countershaft gear 276'; however, it is contemplated that a greater number of gears or a lesser number of gears may be provided. The first countershaft gear 270', second countershaft gear 272', third countershaft gear 274', and the fourth countershaft gear 276' of the second countershaft gear set 214 may be analogous to or may have the same structure as the first countershaft gear 270, second countershaft gear 272, third countershaft gear 274, and the fourth countershaft gear 276, respectively, of the first countershaft gear set 212. The first countershaft gear 270', second countershaft gear 272', third countershaft gear 274', and the fourth countershaft gear 276' may be arranged along and may be rotatable about a second countershaft axis 250' rather than the first countershaft axis 250 and may be fixed to the second countershaft 260' rather than the first countershaft 260.

The first gear 220 and the first countershaft gears 270, 270' may provide a different gear ratio than the second gear 222 and the second countershaft gears 272, 272', the third gear 224 and the third countershaft gears 274, 274', and the fourth gear 226 and the fourth countershaft gears 276, 276'. Gear ratios may be provided that are greater than 1:1, less than 1:1, equal (i.e., 1:1), or combinations thereof.

The teeth of the drive pinion gears and the countershaft gears may be of any suitable type. As a non-limiting example, the meshing teeth of the members of the set of drive pinion gears 210, the gears of the first countershaft gear set 212, and the gears of the second countershaft gear set 214 may have a helical configuration.

Shift Mechanism

Figure 5:
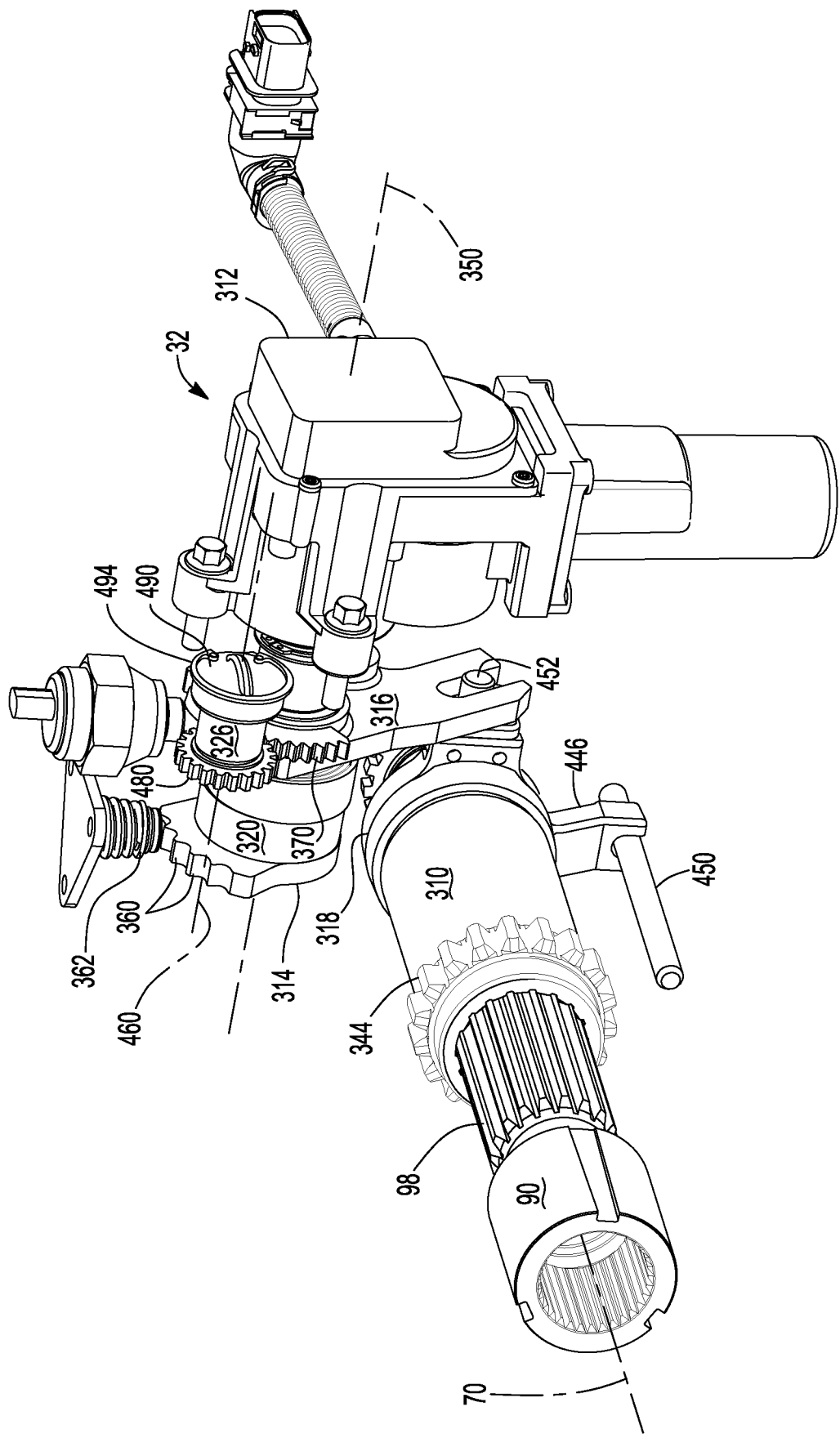
FIG. 5 is a perspective view that includes an example of a shift mechanism having a shift collar that may be provided with the axle assembly.

Referring primarily to FIGS. 2, 5, and 6, the shift mechanism 32 is configured to selectively connect a member of the set of drive pinion gears 210 to the drive pinion 30. For example, the shift mechanism 32 may operatively connect a member of the set of drive pinion gears 210 to the drive pinion 30 to provide torque at a desired gear ratio, and hence may change the torque transmitted between the electric motor module 26 and the differential assembly 22. The shift mechanism 32 may couple one member of the set of drive pinion gears 210 at a time to the drive pinion 30. The member of the set of drive pinion gears 210 that is coupled to the drive pinion 30 may be rotatable about the axis 70 with the drive pinion 30.

Figure 3:
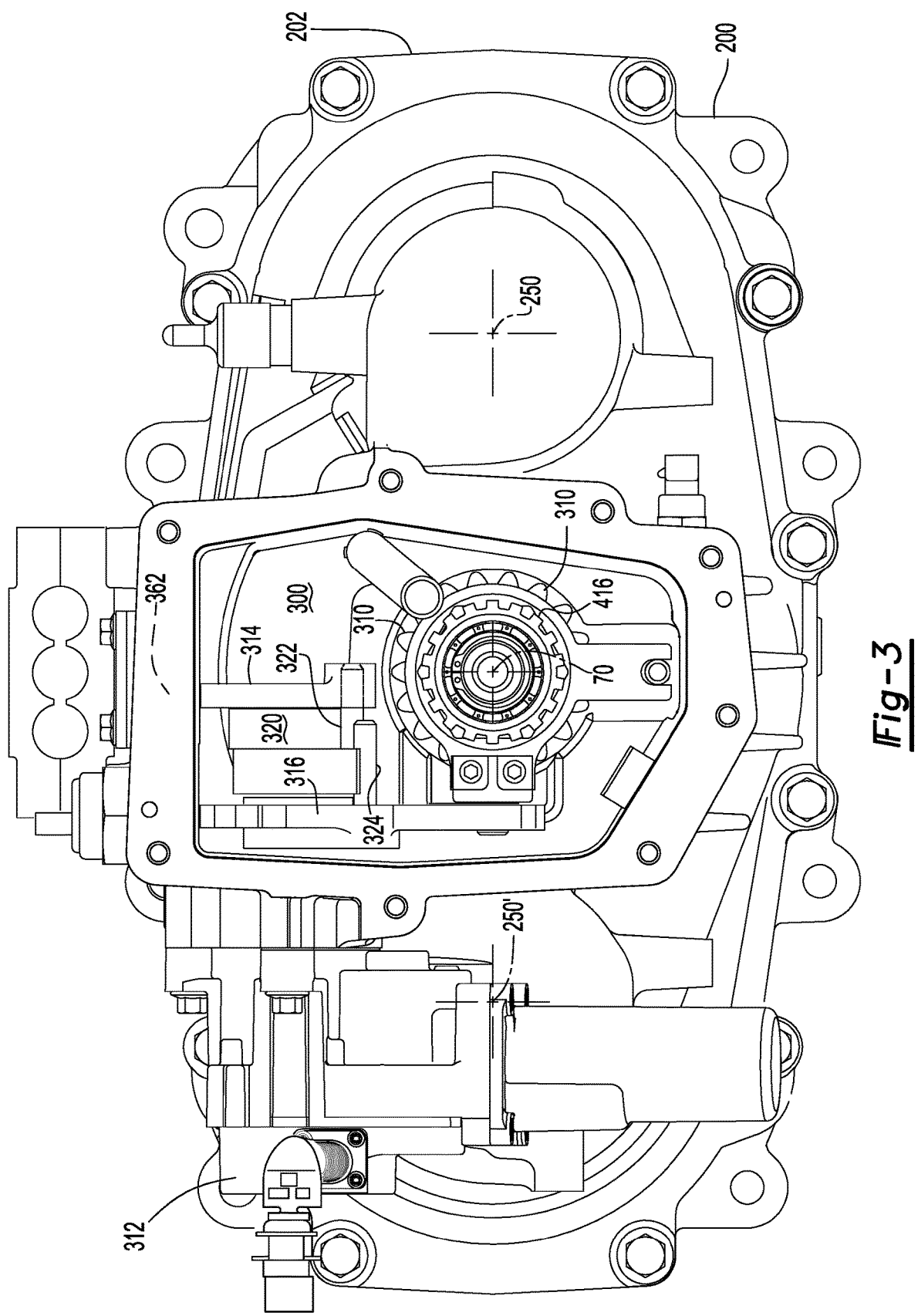
FIG. 3 is an end view of the axle assembly with a portion of cover removed and with an electric motor module and axle housing of the axle assembly omitted for clarity.

The shift mechanism 32 may be received in or partially received in a shift mechanism cavity 300, which is best shown in FIGS. 2 and 3. The shift mechanism cavity 300 may be at least partially defined by the second transmission housing 202 may be disposed proximate an end of the axle assembly 10. Referring to FIGS. 1 and 2, a cover 302 may enclose an end of the axle assembly 10 and help define the shift mechanism cavity 300. The cover 302 may be mounted on the end of the second transmission housing 202 to help enclose the shift mechanism cavity 300. The cover 302 may be a single component or may be an assembly of multiple parts. A portion of the cover 302 is removed in FIG. 3.

The shift mechanism 32 may have any suitable configuration. In at least one configuration such as is shown in FIG. 5, the shift mechanism 32 may include a shift collar 310, an actuator 312, a detent linkage 314, a linkage 316, and a collar 318. The shift mechanism 32 may also include a biasing member 320, a first pin 322, a second pin 324. In this configuration, the shift mechanism 32 includes a drive member 326.

Referring primarily to FIGS. 5 and 6, the shift collar 310 may be rotatable about the axis 70 with the drive pinion 30. In addition, the shift collar 310 may be moveable along the axis 70 with respect to the drive pinion 30. The shift collar 310 may selectively connect a member of the set of drive pinion gears 210 to the drive pinion 30 as will be discussed in more detail below. The shift collar 310 may be at least partially received in the shift mechanism cavity 300 and may be extendable through components of the transmission 204, such as the set of drive pinion gears 210. In at least one configuration, the shift collar 310 may include a first end 330, a second end 332, a shift collar hole 334, and a shift collar spline 336. The shift collar 310 may also include a first tubular shift collar portion 340, a second tubular shift collar portion 342, a shift collar gear 344, a threaded portion 348 or combinations thereof.

Referring primarily to FIG. 6, the first end 330 may face toward the drive pinion 30. In addition, the first end 330 may be disposed adjacent to the drive pinion 30 or the drive pinion extension 90.

The second end 332 may be disposed opposite the first end 330. As such, the second end 332 may face away from the drive pinion 30.

The shift collar hole 334 may extend along the axis 70 between the first end 330 and the second end 332. In at least one configuration, the shift collar hole 334 may be configured as a through hole that may extend from the first end 330 to the second end 332. The drive pinion 30 or the drive pinion extension 90 may be received inside the shift collar hole 334.

The shift collar spline 336 may couple the shift collar 310 to the drive pinion 30 or the drive pinion extension 90. The shift collar spline 336 may be disposed in the shift collar hole 334 and may be axially positioned near the first end 330. The shift collar spline 336 may extend toward the axis 70 and may mate with a spline of the drive pinion 30 or the spline 98 of the drive pinion extension 90 that may have spline teeth that may extend away from the axis 70. The mating splines may allow the shift collar 310 to move in an axial direction or along the axis 70 while inhibiting rotation of the shift collar 310 about the axis 70 with respect to the drive pinion 30. Thus, the shift collar 310 may be rotatable about the axis 70 with the drive pinion 30 when the shift collar spline 336 mates with the spline of the drive pinion 30 or the drive pinion extension 90.

The first tubular shift collar portion 340 may extend from the first end 330 toward the second end 332. The first tubular shift collar portion 340 may have a hollow tubular configuration and may be at least partially received inside the set of drive pinion gears 210 of the transmission 204. The first tubular shift collar portion 340 may have a larger outside diameter than the second tubular shift collar portion 342.

The second tubular shift collar portion 342, if provided, may extend from the second end 332 toward the first tubular shift collar portion 340 or to the first tubular shift collar portion 340. For instance, the second tubular shift collar portion 342 may have a hollow tubular configuration and may be at least partially disposed outside of the set of drive pinion gears 210.

The shift collar gear 344 may be disposed between the first end 330 and the second end 332 of the shift collar 310. In at least one configuration, the shift collar gear 344 may be disposed opposite the shift collar hole 334 and may extend from the first tubular shift collar portion 340. The shift collar gear 344 may have teeth that may be arranged around the axis 70 and that may extend away from the axis 70 and away from the shift collar hole 334. The shift collar spline 336 may be disposed opposite the shift collar gear 344. The shift collar gear 344 is engageable with different members of the set of drive pinion gears 210 as will be discussed in more detail below.

The threaded portion 348 may be axially positioned between the first end 330 and the second end 332. For instance, the threaded portion 348 may be provided with the second tubular shift collar portion 342 and may be axially positioned between the first tubular shift collar portion 340 and the second end 332. The threaded portion 348 may be disposed on an exterior side of the second tubular shift collar portion 342 that may face away from the axis 70. It is also contemplated that the threaded portion 348 may be omitted.

Referring to FIG. 5, the actuator 312 is configured to move the shift collar 310 along the axis 70 to selectively connect a member of the set of drive pinion gears 210 to the drive pinion 30. The actuator 312 may be of any suitable type, such as an electrical, electromechanical, or mechanical actuator. In at least one configuration, the actuator 312 may be mounted to the second transmission housing 202. A portion of the actuator 312 may be rotatable about an actuator axis 350. For instance, the actuator 312 may have an actuator shaft 352 that may extend along the actuator axis 350 and may be rotatable about the actuator axis 350. The actuator shaft 352 may be operatively connected to the detent linkage 314.

The detent linkage 314 is coupled to the actuator 312. For instance, the detent linkage 314 may be fixedly coupled to the actuator shaft 352. As such, the detent linkage 314 may be rotatable about the actuator axis 350 with the actuator shaft 352. The detent linkage 314 may define a plurality of recesses 360. The recesses 360 may be configured to receive a detent feature 362. The detent feature 362 may inhibit rotation of the detent linkage 314 about the actuator axis 350 when the detent feature 362 is received in a recess 360. For example, rotation of the detent linkage 314 may be inhibited when the detent feature 362 is in a recess 360 and a sufficient actuation force is not provided by the actuator 312 to overcome the rotational resistance exerted by the detent feature 362. In at least one configuration, the linkage 316 be rotatably disposed on the detent linkage 314 and rotatable about the actuator axis 350. The linkage 316 may normally rotate with the detent linkage 314 but may rotate with respect to the detent linkage 314 when a blocked shift condition is present.

The linkage 316 may operatively connect the actuator 312 to the shift collar 310. In at least one configuration, the linkage 316 may be positioned along the actuator axis 350 closer to the actuator 312 than the detent linkage 314 is positioned to the actuator 312. In this configuration, the linkage 316 may be rotatable about the actuator axis 350 and may be rotatable with respect to the detent linkage 314. The linkage 316 may have a linkage gear 370.

Figure 9:
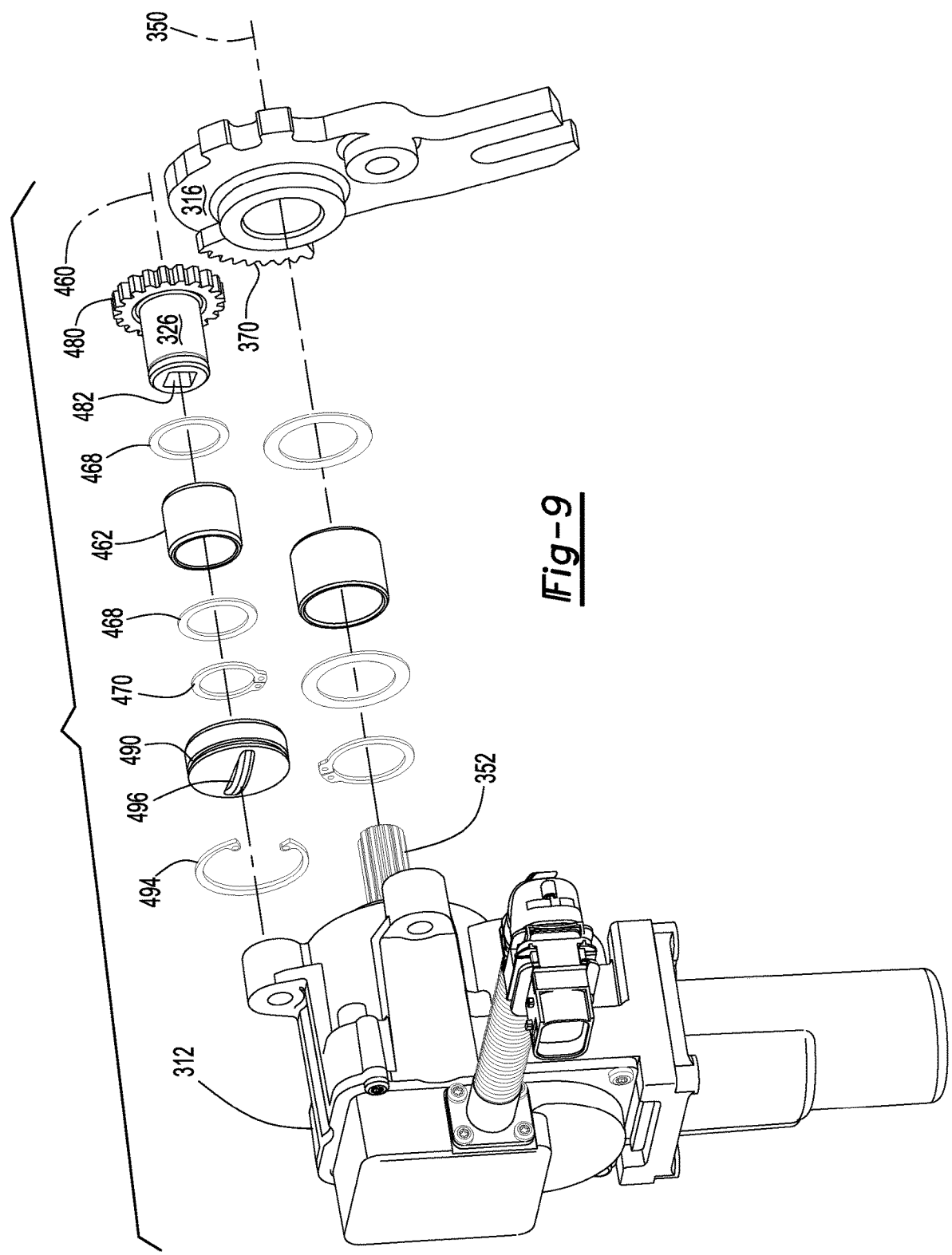
FIG. 9 is an exploded view of a portion of the shift mechanism shown in FIG. 5.

Referring primarily to FIG. 9, the linkage gear 370 may include a plurality of teeth that extend away from the actuator axis 350. In the configuration shown, the linkage gear 370 is configured as a sector gear that extends along an arc or angular distance of approximately 90°. In at least one configuration, the linkage gear 370 may be disposed on a side of the linkage 316 that faces toward the actuator 312.

Referring to FIGS. 5 and 6, the collar 318 may receive the shift collar 310. The collar 318 may extend at least partially around the axis 70 in the shift collar 310. For instance, the collar 318 may be configured as a ring that may extend around the axis 70. The collar 318 may be coupled to the linkage 316 as will be discussed in more detail below. In at least one configuration and as is best shown in FIG. 6, the collar 318 may include a first collar side 440, a second collar side 442, and a collar hole 444. The collar 318 may also include a collar arm 446 and a shift block 448.

The first collar side 440 may face toward the transmission module 28, the drive pinion 30, or both.

The second collar side 442 may be disposed opposite the first collar side 440. As such, the second collar side 442 may face away from the transmission module 28, the drive pinion 30, or both.

The collar hole 444 may extend between the first collar side 440 and the second collar side 442. The collar hole 444 may be a through hole that may extend through the collar 318. The shift collar 310 is received inside the collar hole 444 and may be rotatable about the axis 70 with respect to the collar 318. For instance, the second tubular shift collar portion 342 may be received inside the collar hole 444 and may extend through the collar hole 444. In at least one configuration, the collar hole 444 may receive a bearing assembly that may be positioned between the shift collar 310 and the collar 318. For example, the bearing assembly may extend from an outside circumference of the second tubular shift collar portion 342 to the inside diameter of the collar 318 that defines the collar hole 444.

The collar arm 446 extends from the collar 318. For instance, the collar arm 446 may extend from the collar 318 in a direction that extends away from the axis 70. In the configuration shown, the collar arm 446 is shown extending at an oblique angle from the collar 318 and is angled away from the transmission 204; however, it is contemplated that the collar arm 446 may be angled toward the transmission 204 or may be disposed substantially perpendicular to the axis 70. The term "substantially perpendicular" is used herein to designate features or axes that are the same as or very close to perpendicular and includes features that are within ±3° of being perpendicular each other. The collar arm 446 may be integrally formed with the collar 318 or may be a separate component that is fastened to the collar 318. In the configuration shown, the collar arm 446 is illustrated as being integrally formed with the collar 318 and is disposed below the axis 70. The collar arm 446 is moveably disposed on an alignment rod 450. The collar arm 446 and the alignment rod 450 may cooperate to limit or inhibit rotation of the collar 318 about the axis 70.

The alignment rod 450 is disposed on the shift mechanism cavity 300. For instance, the alignment rod 450 may be received in the shift mechanism cavity 300 and may be mounted to the second transmission housing 202, the cover 302, or both. In the configuration shown, the alignment rod 450 is shown as being received in a pocket or recess in the cover 302 and in a pocket of the second transmission housing 202. The alignment rod 450 may be fixedly disposed on the cover 302 or the second transmission housing 202 or may be disposed in a manner in which movement of the alignment rod 450 is limited. For example, the alignment rod 450 may slide along the axis 70 and/or rotate about the axis 70 but may remain its axial orientation. The alignment rod 450 may be disposed substantially parallel to the axis 70. In at least one configuration, the alignment rod 450 may be disposed below the axis 70, below the shift collar 310, or both. In at least one configuration, the collar arm 446 has an opening in which the alignment rod 450 may be received. The opening may be a hole, recess, slot or the like inside which the alignment rod 450 may be received. It is also contemplated that the alignment rod 450 may define a recess or slot that extends along its axial length and a portion of the alignment rod 450, such as the end of the alignment rod 450, may be received in the recess or slot in the alignment rod 450.

Referring to FIG. 6, the shift block 448, if provided, may be fixedly positioned with respect to the collar 318. The shift block 448 may be integrally formed with the collar 318 or may be provided as a separate component that is attached to the collar 318. For instance, the shift block 448 may extend from an outside circumference of the collar 318, the second collar side 442, or combinations thereof. The shift block 448, if provided, may facilitate mounting of a fastener 452 that may connect or couple the linkage 316 to the collar 318.

The first thrust bearing 410 may facilitate rotation of the shift collar 310 about the axis 70 with respect to the collar 318. The first thrust bearing 410 may be axially positioned between the first collar side 440 and the shift collar 310. Optionally, washers may be axially positioned adjacent to one or both sides of the first thrust bearing 410.

The second thrust bearing 412 may facilitate rotation of the shift collar 310 about the axis 70 with respect to the collar 318. The second thrust bearing 412 may be positioned between the second collar side 442 and the retainer nut 414. Optionally a washer may be axially positioned adjacent to one or both sides of the second thrust bearing 412. For example, a washer may be provided between the second thrust bearing 412 and the retainer nut 414.

The retainer nut 414 may be mounted to the shift collar 310. For instance, the retainer nut 414 may have a threaded hole that may receive the second tubular shift collar portion 342 and mate with the threaded portion 348 of the shift collar 310. The retainer nut 414 may inhibit axial movement of the shift collar 310 with respect to the collar 318 and may help secure the first thrust bearing 410 and the second thrust bearing 412. It is also contemplated that the retainer nut 414 may be omitted and a different fastener or fastening technique may be used. For instance, a fastener like a snap ring or a press-fit fastener may replace a threaded connection.

An encoder disc 416 may optionally be mounted to the drive pinion 30 or the drive pinion extension 90. In at least one configuration, the encoder disc 416 may be disposed adjacent to the retainer nut 414. For instance, the encoder disc 416 may be axially positioned between the retainer nut 414 and a support bearing 418 that rotatably supports the drive pinion 30 or drive pinion extension 90. For example, the encoder disc 416 may be positioned between a shoulder of the drive pinion 30 or drive pinion extension 90 and the support bearing 418, if provided. The encoder disc 416 may have detectable features such as protrusions and/or recesses that may be detectable by a sensor to detect rotation or the rotational speed of the drive pinion 30.

The support bearing 418 may rotatably support the drive pinion 30 or drive pinion extension 90. For instance, the drive pinion 30 or drive pinion extension 90 may be received inside and may be rotatably supported by the support bearing 418, which in turn may be supported by the second transmission housing 202, the cover 302, or both.

Referring to FIG. 5, the biasing member 320 may operatively connect the detent linkage 314 to the linkage 316. In addition, the biasing member 320 may control relative rotational movement between the detent linkage 314 and the linkage 316 (e.g., rotational movement of the linkage 316 with respect to the detent linkage 314). For example, the biasing member 320 may permit the actuator shaft 352 and the detent linkage 314 to rotate about the actuator axis 350 with respect to the linkage 316 when the shift collar 310 is inhibited from moving along the axis 70, such as during a blocked shift as will be discussed in more detail below. The biasing member 320 may be positioned along the actuator axis 350 between the detent linkage 314 and the linkage 316. The biasing member 320 may have any suitable configuration. For instance, the biasing member 320 may be configured as a spring, such as a torsion spring.

The first pin 322 may extend from the detent linkage 314 toward the linkage 316. The first pin 322 may be spaced apart from the linkage 316. The first pin 322 may engage an end or tab of the biasing member 320.

The second pin 324 may extend from the linkage 316. The second pin 324 may be spaced apart from the first pin 322 and the detent linkage 314. The second pin 324 may engage the same end or tab and/or a different end or tab of the biasing member 320.

Figure 10:
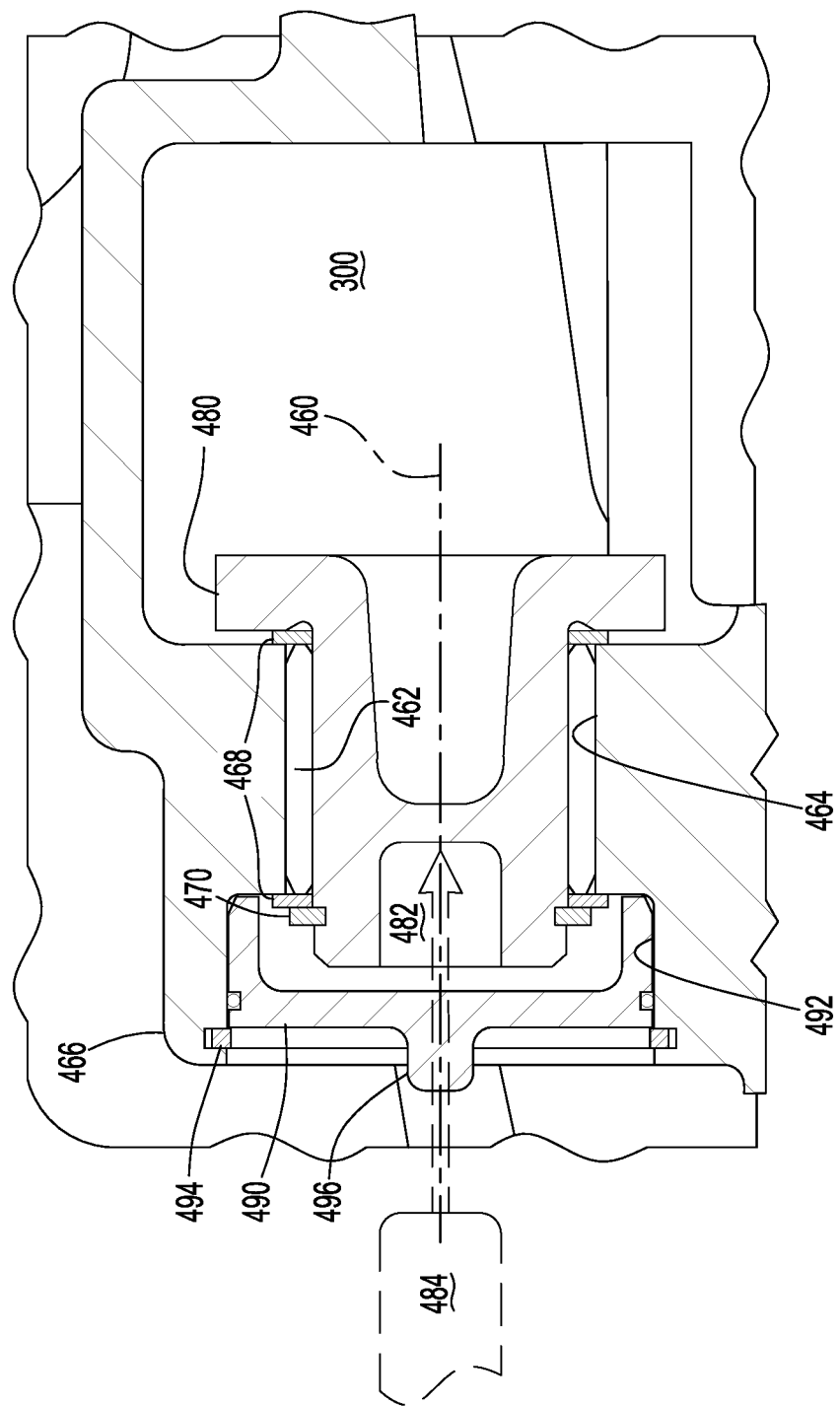
FIG. 10 is a section view of a portion of the axle assembly along section line 10-10.
Figure 11:
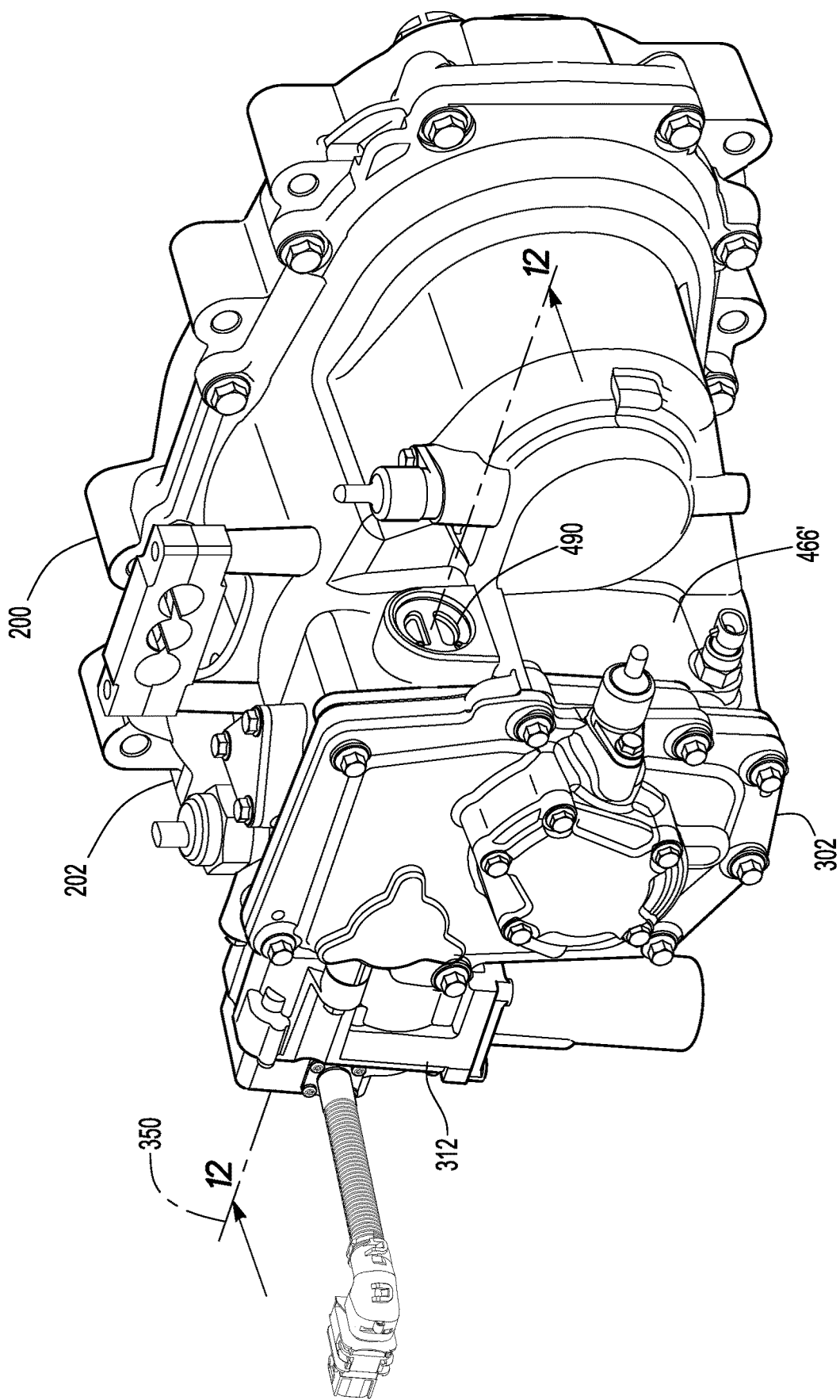
FIG. 11 is a perspective view of a portion of another configuration of the axle assembly with the electric motor module and drive pinion omitted for clarity.

Referring to FIGS. 5, 7, 9, and 10, the drive member 326 is rotatable about a drive member axis 460. For example, as is best shown in FIG. 10 the drive member 326 may be rotatably disposed on a bearing or bushing 462 that may be received in a hole 464 in a housing, such as a shift mechanism housing 466 that at least partially defines the shift mechanism cavity 300. The shift mechanism housing 466 may be the second transmission housing 202, a portion of the second transmission housing 202, or a housing component that is separate from the second transmission housing 202 and that may be mounted to the second transmission housing 202. Opposing ends of the bushing 462 may engage corresponding washers 468. The washers 468 may be disposed outside of the hole 464.

A retainer 470, such as a snap ring, clip, fastener, or the like, may be mounted on the drive member 326 and may engage a washer 468 to inhibit axial movement of the drive member 326. The drive member 326 may extend through the hole 464 such that opposing ends of the drive member 326 are disposed outside of the hole 464.

Referring to FIGS. 9 and 10, the drive member 326 may include a drive member gear 480 and a drive member engagement feature 482.

The drive member gear 480 has teeth that are arranged around the drive member axis 460. The teeth may extend away from the drive member axis 460 and that mesh with teeth of the linkage gear 370. The drive member gear 480 may be disposed at an end of the drive member 326 and may be received inside the shift mechanism cavity 300.

The drive member engagement feature 482 may be disposed at an end of the drive member 326. For instance, the drive member engagement feature 482 may be disposed at an opposite end of the drive member 326 from the drive member gear 480. The drive member engagement feature 482 may have any suitable configuration. For instance, the drive member engagement feature 482 may have a male configuration, female configuration, or combinations thereof. In the configuration shown in FIG. 10, the drive member engagement feature 482 has a female configuration. The drive member engagement feature 482 may be engageable with a tool 484, which is shown in phantom in FIG. 10. The tool 484 may be used to manually actuate the drive member 326. The tool 484 may have any suitable configuration. For instance, the tool 484 may be a driver bit, socket, screwdriver, or the like. The term manual actuation includes both force that is exerted by a person and force that is exerted by device, such as a power tool that may be electrically or pneumatically powered or other actuator that may not be mounted on the axle assembly 10.

A cap 490 may be removably mounted on the shift mechanism housing 466. The cap 490 may cover or conceal the drive member 326 when the cap 490 is mounted to the shift mechanism housing 466. The cap 490 may be removed to permit access to the drive member 326. The cap 490 may be received in a bore 492 that extends from the hole 464 in the shift mechanism housing 466. The bore 492 may have a larger diameter than the hole 464. The cap 490 may be spaced apart from the drive member 326, bushing 462, washers 468, retainer 470, bore 492, or combinations thereof. The cap 490 may have any suitable configuration. For instance, the cap 490 may be externally threaded and may mate with a corresponding threaded wall that defines the bore 492. It is also contemplated that the cap 490 may not be threaded and may be secured in the bore 492 with an interference fit or a retainer 494, such as a snap ring, clip, fastener, or the like. In the configuration shown in FIG. 10, a retainer 494 is received in a groove that extends from the bore 492. The cap 490 may also include a handle 496 that may be grasped to facilitate insertion and removal of the cap 490.

The drive member 326 may be manually actuated to rotate the linkage 316. For instance, the cap 490, if provided, may be removed from the bore 492. Next, the tool 484 may be aligned with the drive member engagement feature 482 and engaged with the drive member engagement feature 482, such as by moving the tool 484 along the drive member axis 460 toward the drive member 326 and into the bore 492. Next, the tool 484 may be rotated about the drive member axis 460, such as by manually rotating the tool 484 or by rotating the tool with a power tool or other actuator as previously discussed. The tool 484 may be rotated in a clockwise direction or counterclockwise direction about the drive member axis 460 depending on the direction in which one wants to move the shift collar 310 along the axis 70. The shift collar 310 is moveable along the axis 70 when the drive member 326 is rotated. More specifically, rotating the drive member 326 causes the linkage 316 to rotate about the actuator axis 350 due to the meshing of the drive member gear 480 and the linkage gear 370. Rotation of the linkage 316 in turn causes the shift collar 310 to move along the axis 70.

It is contemplated that manual actuation of the drive member 326 may be employed for maintenance purposes or during assembly to help position the shift collar 310 along the axis 70 independently from operation of the actuator 312. As such, the shift collar 310 is moveable along the axis 70 when the actuator 312 rotates, in which case the drive member 326 may not be manually actuated, and the shift collar 310 is also moveable along the axis 70 when the drive member 326 is manually actuated, in which case the actuator 312 may not be operated to actuate the shift collar 310.

Various components of the shift mechanism 32 may typically move together when the shift collar 310 is free to move along the axis 70. For instance, components such as the actuator shaft 352, detent linkage 314, linkage 316, and the biasing member 320 may rotate together about the actuator axis 350 when the actuator shaft 352 is rotated and the shift collar 310 is free to move along the axis 70. However, some of these components may move respect to each other when the shift collar 310 is not free to move along the axis 70. For example, the actuator shaft 352 and the detent linkage 314 may be rotatable with respect to the linkage 316 when the shift collar 310 is not free to move along the axis 70. The shift collar 310 may not be free to move along the axis 70 when the rotational speed of the shift collar 310 about the axis 70 is not sufficiently synchronized with the rotational speed of a member of the set of drive pinion gears 210. For instance, the shift collar 310 may be blocked from shifting or moving along the axis 70 when the teeth of the shift collar gear 344 are inhibited from entering the gaps between the inner gear teeth of a drive pinion gear or exiting the gaps between the inner gear teeth of a drive pinion gear.

Relative rotational movement of the detent linkage 314 with respect to the linkage 316 is accommodated by the biasing member 320 when there is a blocked shift. For instance, the first pin 322 may remain in engagement with the second end or second tab of the biasing member 320 but may be rotated to disengage or move away from the first end or first tab of the biasing member 320. The second pin 324 may remain in engagement with the first end but may be disengaged from the second end. This relative rotational movement may store potential energy in the biasing member 320. The potential energy may be released when the blocked shift condition is no longer present, such as when the rotational speed of the shift collar 310 is sufficiently synchronized with the rotational speed of a member of the set of drive pinion gears 210 to permit axial movement of the shift collar 310. As a result, the actuator 312 may complete its intended rotation of the actuator shaft 352 as if the shift collar 310 not blocked even when a blocked shift condition is present, thereby avoiding heating/overheating of the actuator 312 and the consumption of energy that would occur if the actuator 312 had to continuously work or exert force to attempt to complete shifting of the shift collar 310. Moreover, sufficient potential energy may be stored in the biasing member 320 that may be released to complete a shift of the shift collar 310 when sufficient synchronization is obtained.

Referring to FIGS. 11-14, a portion of another configuration of an axle assembly is shown. This configuration employs the same housing assembly 20, a differential assembly 22, axle shafts 24, the electric motor module 26, transmission module 28, and drive pinion 30, and related components as previously described but has a different configuration for some components of the shift mechanism and the shift mechanism housing. For clarity, the shift mechanism associated with this configuration is designated with reference number 32' and the shift mechanism housing is designated with reference number 466'.

Figure 13:
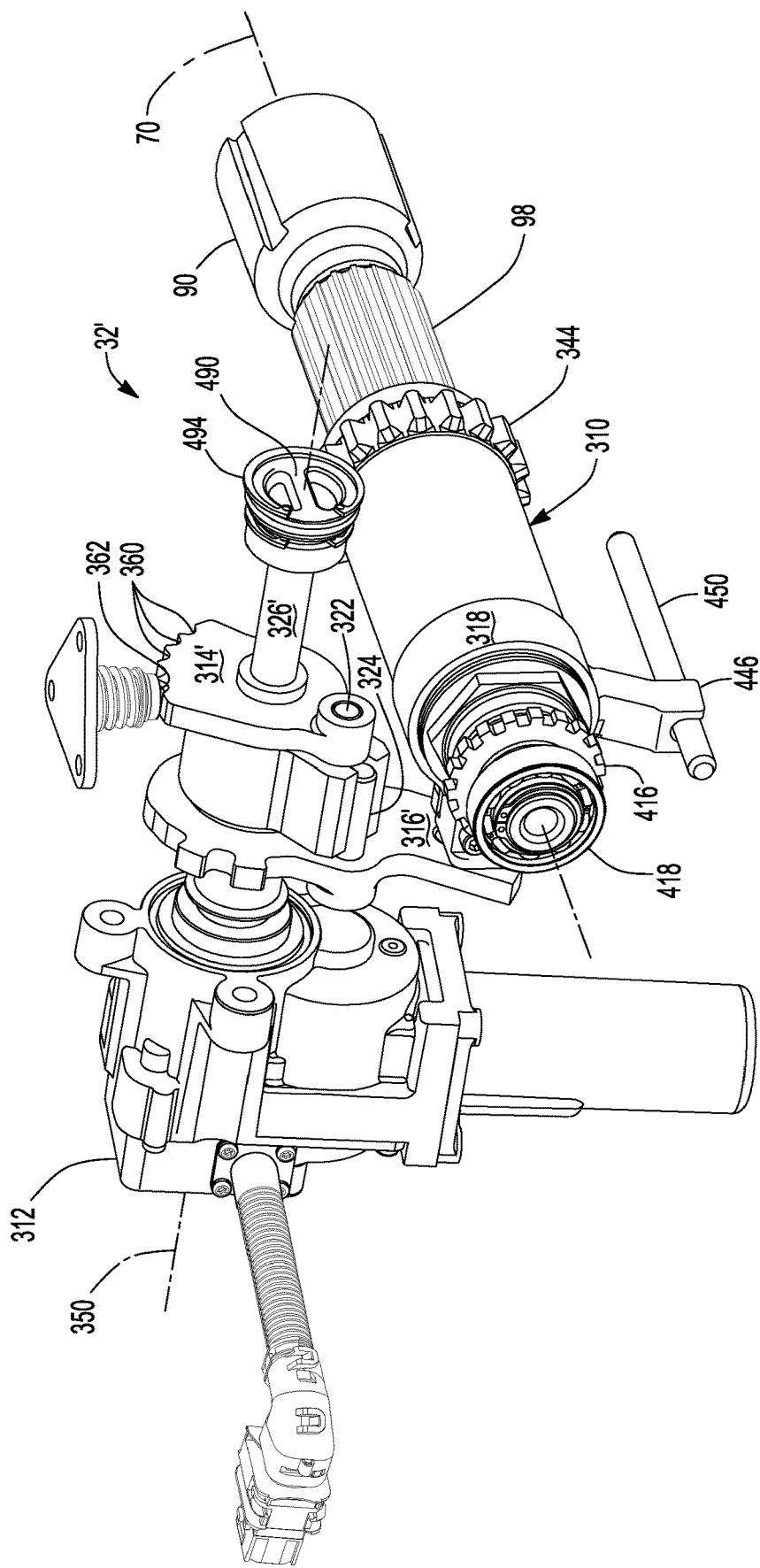
FIG. 13 is a perspective view of the shift mechanism associated with FIGS. 11 and 12.

Referring to FIG. 13, the shift mechanism 32' employs the same shift collar 310, actuator 312, collar 318, first pin 322, and second pin 324 as previously described. This configuration also includes detent linkage 314', a linkage 316', and a drive member 326' and may include a connecting block 320'. The biasing member 320 is not included in this configuration.

Figure 12:
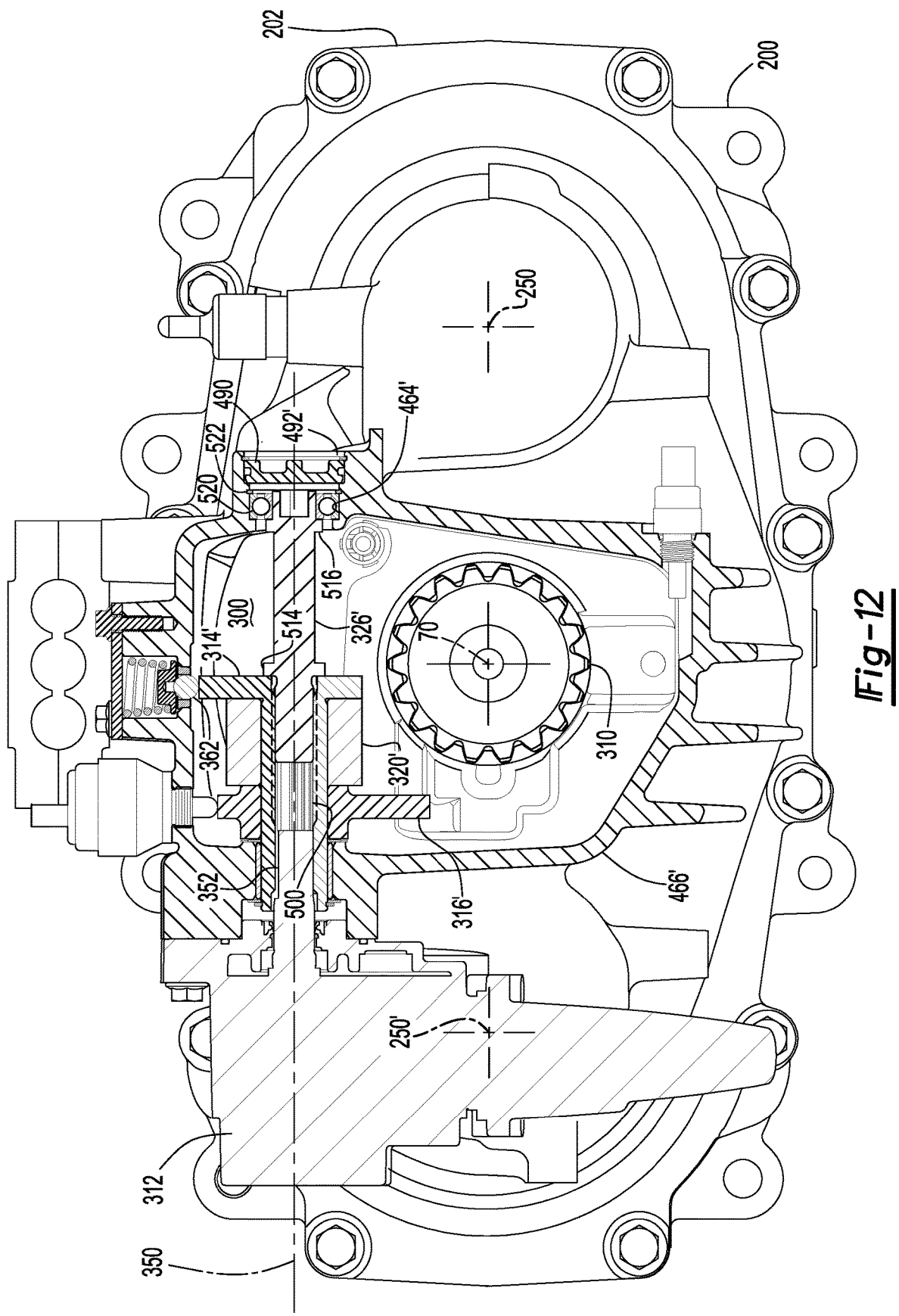
FIG. 12 is a section view of the portion of the axle assembly along section line 12-12 that includes a second configuration of shift mechanism.
Figure 14:
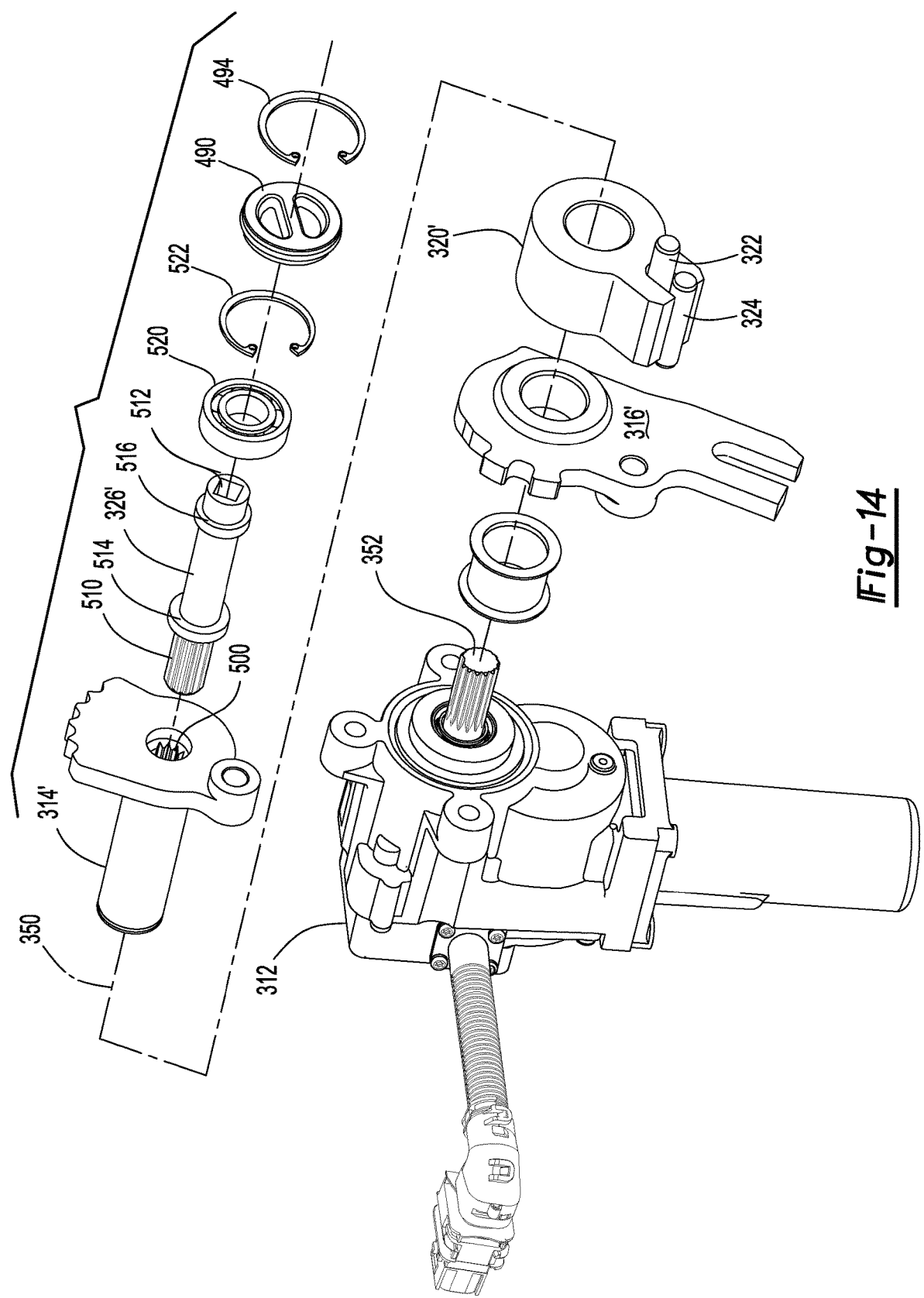
FIG. 14 is an exploded view of a portion of the shift mechanism shown in FIG. 13.
Figure 15:
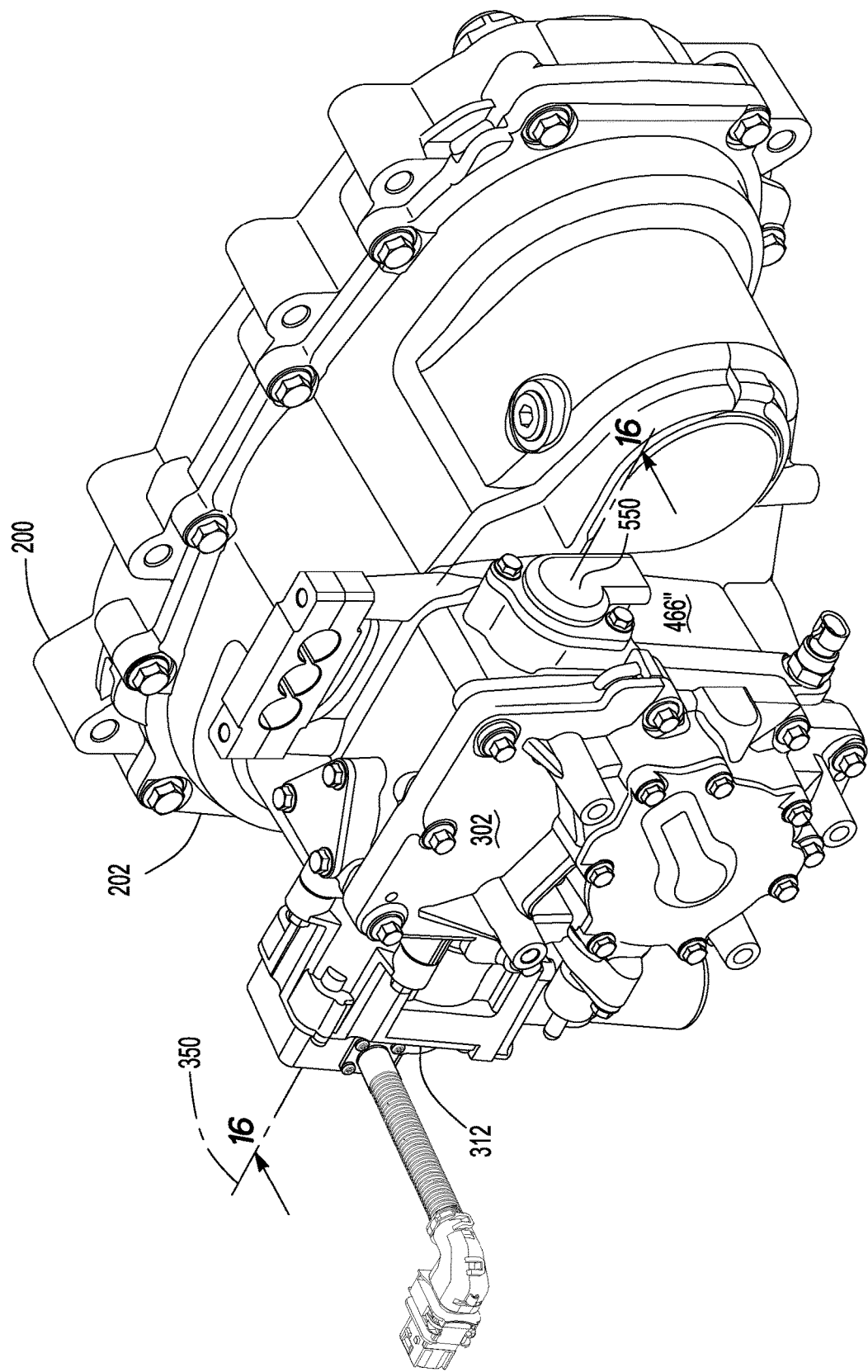
FIG. 15 is a perspective view of a portion of another configuration of the axle assembly with the electric motor module and drive pinion omitted for clarity.

The detent linkage 314' is the same as the detent linkage 314 previously described except that the detent linkage 314' may be configured to be coupled to the drive member 326'. The detent linkage 314' may be coupled to the drive member 326' in any suitable manner. For instance, the detent linkage 314' may have a male configuration while the drive member 326' may have a female configuration or vice versa. In the configuration shown, the drive member 326' is received inside the detent linkage 314'. For example, the detent linkage 314' may have a detent linkage spline 500, which is best shown in FIGS. 12 and 14, that may mate with a corresponding drive member spline 510 on the drive member 326'. The detent linkage spline 500 may be arranged around the actuator axis 350 and may be disposed in a hole in the detent linkage 314'.

The linkage 316' is the same as the linkage 316 previously described except for two main differences. First, the linkage 316' does not have a linkage gear 370. Second, the linkage 316' is not rotatable about the actuator axis 350 with respect to the detent linkage 314'. Instead, the detent linkage 314' rotates with the linkage 316'. The detent linkage 314' may be fixedly connected to the linkage 316' in any suitable manner. For instance, the detent linkage 314' and the linkage 316' may be integrally formed, welded, fastened together such as with one or more fasteners, or the like. In the configuration shown, a connecting block 320' facilitates coupling of the detent linkage 314' and the linkage 316'. For example, the connecting block 320' may be disposed between the detent linkage 314' and the linkage 316' and may receive the first pin 322 and the second pin 324 to inhibit rotation of the detent linkage 314' with respect to linkage 316'.

The drive member 326' is rotatable about the actuator axis 350 with the detent linkage 314'. In at least one configuration, the drive member 326' may include a drive member spline 510, a drive member engagement feature 512, a first hub 514, a second hub 516, or combinations thereof.

The drive member spline 510 may be configured to mate with the detent linkage spline 500. In at least one configuration, the drive member spline 510 may extend between a first end of the drive member 326' and the first hub 514. In such a configuration, the drive member spline 510 may be received inside the hole in the detent linkage 314'. It is also contemplated that the drive member spline 510 may have a female configuration that encircles a corresponding spline on the detent linkage 314' rather than a male configuration as shown.

The drive member engagement feature 512 may be analogous to the drive member engagement feature 482 previously discussed. For instance, the drive member engagement feature 512 may be disposed at a second end of the drive member 326' that may be disposed opposite the first end. As such, the drive member engagement feature 512 and the drive member spline 510 may be disposed at opposite ends of the drive member 326'. The drive member engagement feature 512 may have any suitable configuration. For instance, the drive member engagement feature 512 may have a male configuration, female configuration, or combinations thereof. In the configuration shown in FIG. 14, the drive member engagement feature 512 has a female configuration. The drive member engagement feature 512 may be engageable with a tool 484 that may be used to manually actuate the drive member 326'.

The first hub 514 may be configured as a protrusion or annular ring that may extend away from the actuator axis 350. The first hub 514 may limit axial movement of the drive member 326' in a direction that extends toward the actuator 312. For instance, the first hub 514 may have a larger diameter than the hole in the detent linkage 314' and may engage a side of the detent linkage 314' that faces away from the actuator 312 to inhibit axial movement of the drive member 326' toward the actuator 312.

The second hub 516 may be spaced apart from the first hub 514. The second hub 516 may be configured as a protrusion or annular ring that may extend away from the actuator axis 350. The second hub 516 may limit axial movement of the drive member 326' in a direction that extends away from the actuator 312. For instance, the second hub 516 may have a larger diameter than a component that receives or encircles the drive member 326', such as a bushing or bearing 520 that may rotatably support the drive member 326', and may engage a side of such a component that faces toward the actuator 312 to inhibit axial movement of the drive member 326' away from the actuator 312.

Referring to FIG. 12, the bearing 520 may be received in a hole 464' in the shift mechanism housing 466'. A retainer 522, such as a snap ring clip or the like, may engage an outer race of the bearing 520 to secure the bearing 520 in the hole 464'. For instance, a retainer 522 may be disposed on a side of the bearing 520 that is disposed opposite the second hub 516 and may inhibit or limit axial movement of the bearing 520 away from the actuator 312. In addition, a portion of the drive member 326' that is encircled by the bearing 520 and optionally the second hub 516 may be received in the hole in the shift mechanism housing 466'. Thus, a portion of the drive member 326' may be received in or extend through the hole 464' in the shift mechanism housing 466'. The shift mechanism housing 466' may be similar or the same as the shift mechanism housing 466 previously discussed except for the location of the hole that receives the drive member 326.

Also as previously discussed, the shift mechanism housing 466' may define a bore 492' that extends from the hole 464' in the shift mechanism housing 466'. The bore 492' may have a larger diameter than the hole 464'. The bore 492' may receive a cap 490 and optionally a retainer 494 as previously described. The hole 464' and the bore 492' may be the same as or substantially similar to the hole 464 and the bore 492 previously described but may be disposed along the actuator axis 350 rather than along a drive member axis that is disposed parallel to and is offset from the actuator axis 350.

The drive member 326' may be manually actuated to rotate a shaft of the actuator 312, detent linkage 314' and the linkage 316' and thus to actuate the shift collar 310. Rotation of the linkage 316' cause the shift collar 310 to move along the axis 70. It is contemplated that manual actuation of the drive member 326' may be employed for maintenance purposes or during assembly to help position the shift collar 310 along the axis 70. Steps associated with manually actuating the drive member 326' with a tool 484 may be similar or the same as the steps previously discussed.

Referring to FIGS. 15-19, a portion of another configuration of an axle assembly is shown. This configuration is similar to the configuration shown in FIGS. 11-14 in which the drive member is disposed along the actuator axis 350. This configuration employs the same housing assembly 20, a differential assembly 22, axle shafts 24, electric motor module 26, transmission module 28, and drive pinion 30, and related components as previously described but has a different configuration for some components of the shift mechanism and the shift mechanism housing. For clarity, the shift mechanism associated with this configuration is designated with reference number 32" and the shift mechanism housing is designated with reference number 466".

Figure 17:
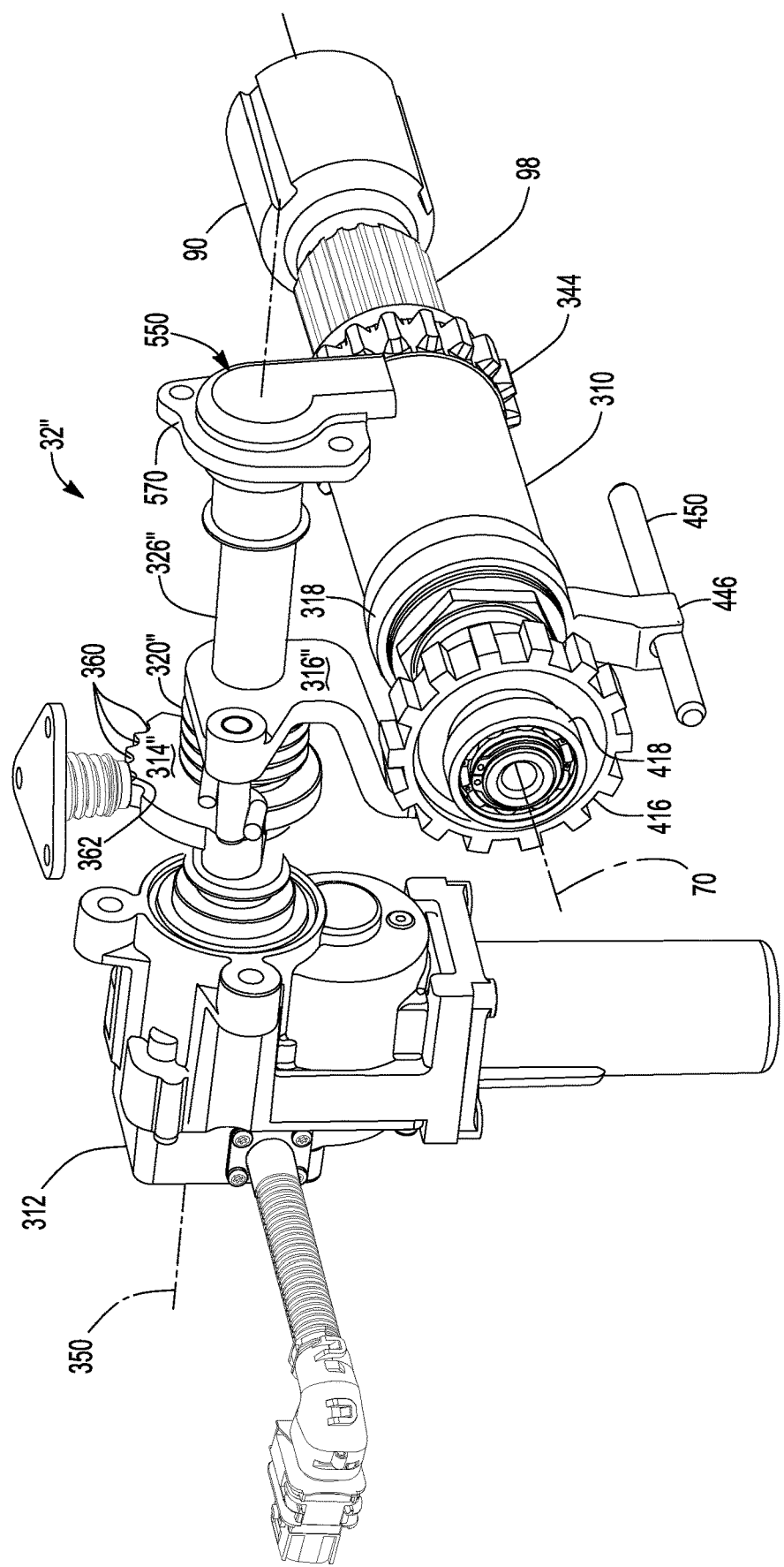
FIG. 17 is a perspective view of the shift mechanism associated with FIGS. 15 and 16.

Referring to FIG. 17, the shift mechanism 32" employs the same shift collar 310, actuator 312, collar 318, first pin 322, and second pin 324 as previously described. This configuration also includes detent linkage 314", a linkage 316", a biasing member 320", and a drive member 326". In addition, this configuration may also include a sensor 550 and optionally an adapter 552.

Figure 18:
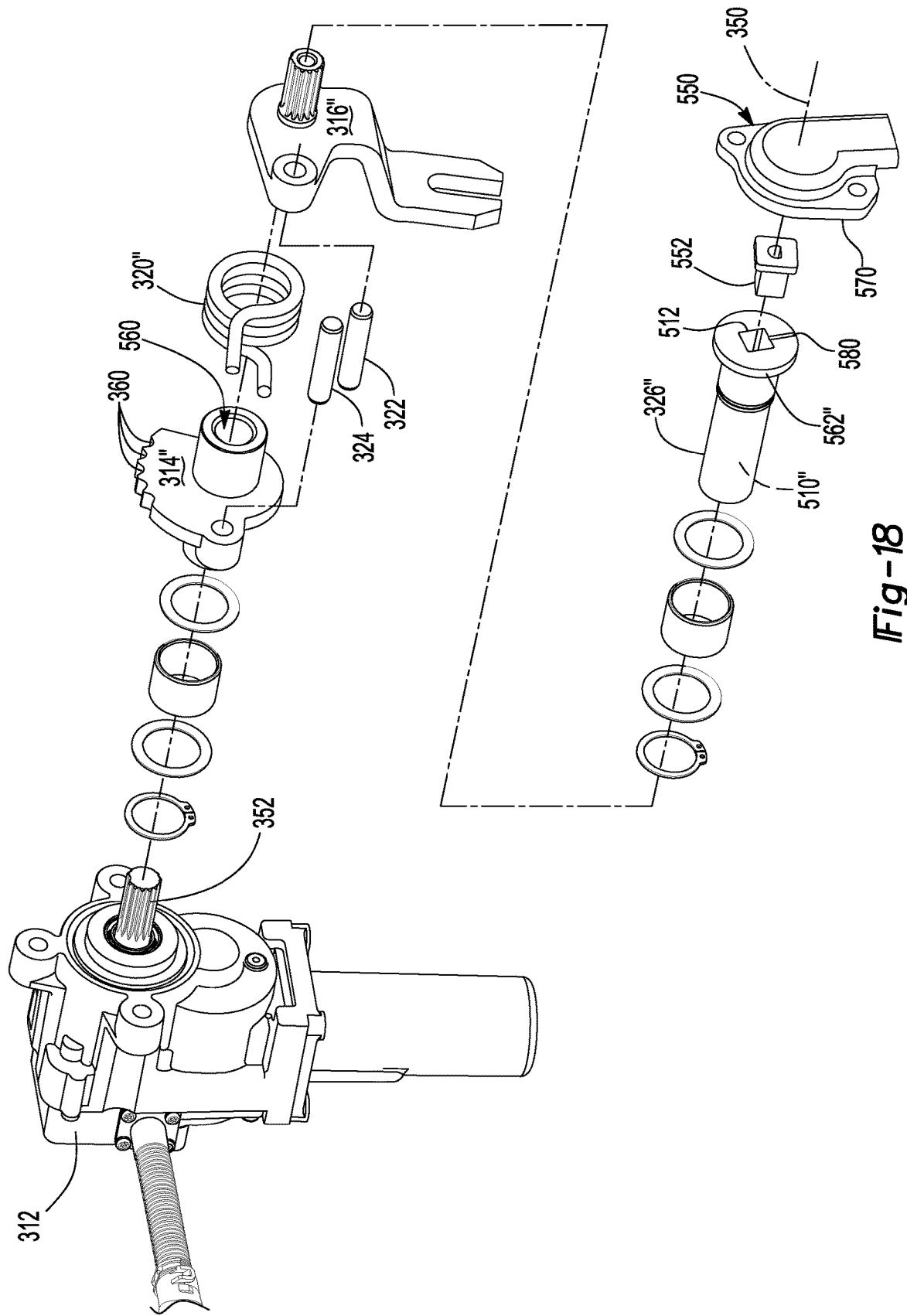
FIG. 18 is an exploded view of a portion of the shift mechanism shown in FIG. 17.

Referring primarily to FIGS. 17 and 18, the detent linkage 314" is coupled to the actuator 312 and is rotatable about the actuator axis 350 with the actuator shaft 352. In addition, the detent linkage 314" may define a plurality of recesses 360 as previously described. In this configuration, the detent linkage 314" is axially positioned between the actuator 312 and the linkage 316". Thus, the detent linkage 314" may be positioned along the actuator axis 350 closer to the actuator 312 than the linkage 316" is positioned to the actuator 312. The detent linkage 314" may be coupled to the actuator 312 and the linkage 316" with a male configuration, female configuration, or combinations thereof. In the configuration shown, the detent linkage 314" receives the actuator shaft 352 and the linkage 316". For instance, the detent linkage 314" may include a detent linkage hole 560 that receives the actuator shaft 352 and the linkage 316" or separate detent linkage holes that receive the actuator shaft 352 and the linkage 316", respectively. In at least one configuration, the detent linkage 314" may have splines that mate with corresponding splines on the actuator shaft 352 and may have a smooth spline-free surface that engages the linkage 316".

The linkage 316" may operatively connect the actuator 312 to the shift collar 310. In this configuration, the linkage 316" may be rotatable about the actuator axis 350 and may be rotatable with respect to the detent linkage 314". In the configuration shown, the linkage 316" is axially positioned between and engages the detent linkage 314" and the drive member 326". The linkage 316" may have a nonplanar or bent configuration as compared to the linkages 316, 316' previously described. For instance, the linkage 316" may extend downward toward the axis 70 and may bend toward the actuator 312 and extend away from the axis 70. Then the linkage 316" may bend again in a direction that extends away from the actuator axis 350 and thereby position the end of the linkage 316" in the same position as the linkages previously described. The linkage 316" may interface with the detent linkage 314" and the drive member 326" with a male configuration, female configuration, or combinations thereof. In the configuration shown, the linkage 316" has a male configuration that is received inside the detent linkage 314" and the drive member 326". The linkage 316" may be connected to the drive member 326" such that the linkage 316" and the drive member 326" are rotatable together about the actuator axis 350.

The biasing member 320" may be similar to or the same as the biasing member 320 previously described. The biasing member 320" may operatively connect the detent linkage 314" to the linkage 316".

The biasing member 320" may permit the actuator shaft 352 and the detent linkage 314" to rotate about the actuator axis 350 with respect to the linkage 316" when the shift collar 310 is inhibited from moving along the axis 70, such as during a blocked shift as previously discussed. The biasing member 320" may have first and second ends or tabs that may engage the first pin 322 and the second pin 324, respectively, as previously discussed.

Figure 16:
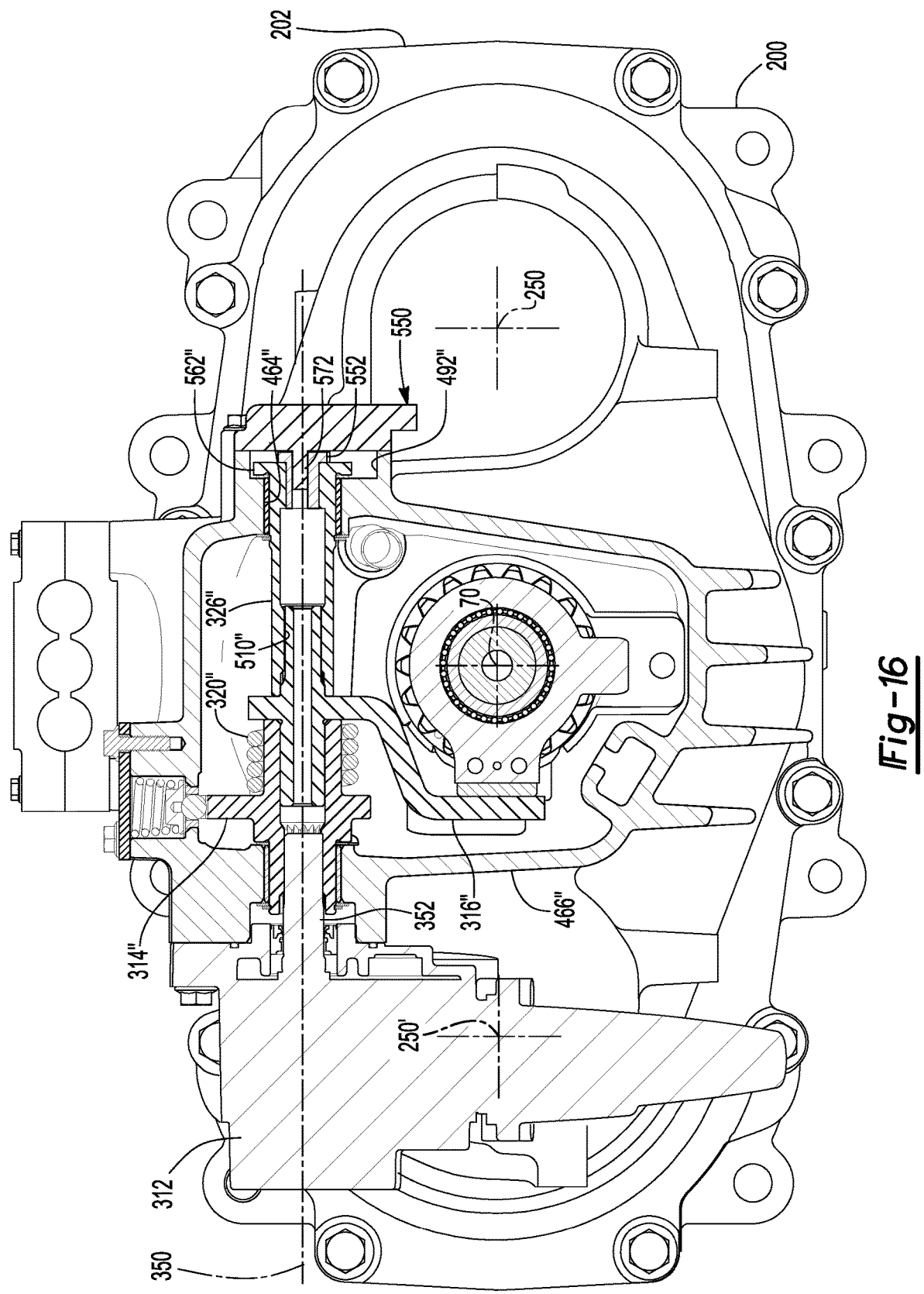
FIG. 16 is a section view of the portion of the axle assembly along section line 16-16 that includes a third configuration of a shift mechanism.

The drive member 326" is rotatable about the actuator axis 350 with the detent linkage 314". Referring primarily to FIGS. 16 and 18, the drive member 326" may include a drive member spline 510" and a drive member flange 562".

The drive member spline 510" may mate with a corresponding spline on the linkage 316". In the configuration shown, the drive member spline 510" is disposed inside a hole or bore in the drive member 326".

The drive member flange 562" may be disposed at or near an end of the drive member 326" that may be disposed opposite the detent linkage 314". For instance, the drive member flange 562" may be disposed in the bore 492" in the shift mechanism housing 466". The drive member flange 562" may extend away from the actuator axis 350 and may be larger than the hole 464" in the shift mechanism housing 466" through which the drive member 326" extends, thereby inhibiting axial movement of the drive member 326" toward the actuator 312. Alternatively or in addition, the drive member flange 562" may be larger than a hole in a bushing that is disposed in the hole 464" in the shift mechanism housing 466".

The sensor 550 is configured to generate a signal indicative of a rotational position of the drive member 326". The sensor 550 may effectively replace the cap associated with the previous configurations. The sensor 550 may be coupled to the drive member 326". For instance, the sensor 550 may have a sensor housing 570 that may be mounted to or secured to the shift mechanism housing 466". In the configuration shown, the sensor 550 and more specifically the sensor housing 570 is disposed outside of the shift mechanism housing 466". The sensor 550 may have a sensor shaft 572 that may be connectable to the drive member 326". For instance, the sensor shaft 572 may extend from the sensor housing 570 and that may be rotatable about the actuator axis 350 with respect to the sensor housing 570. The sensor shaft 572 may be directly or indirectly coupled to the drive member 326". In the configuration shown, the sensor 550 and the sensor shaft 572 are indirectly coupled to the drive member 326" with the adapter 552.

The adapter 552, if provided, may extend from the sensor 550 to the drive member 326". The adapter 552 may interface with the sensor shaft 572 in any suitable manner, such as with a male configuration, female configuration, or combinations thereof. In the configuration shown, the adapter 552 is received inside the drive member 326" and the sensor shaft 572 is received inside a hole in the adapter 552. As such, the sensor shaft 572, the adapter 552, and the drive member 326" may be rotatable together about the actuator axis 350.

Figure 19:
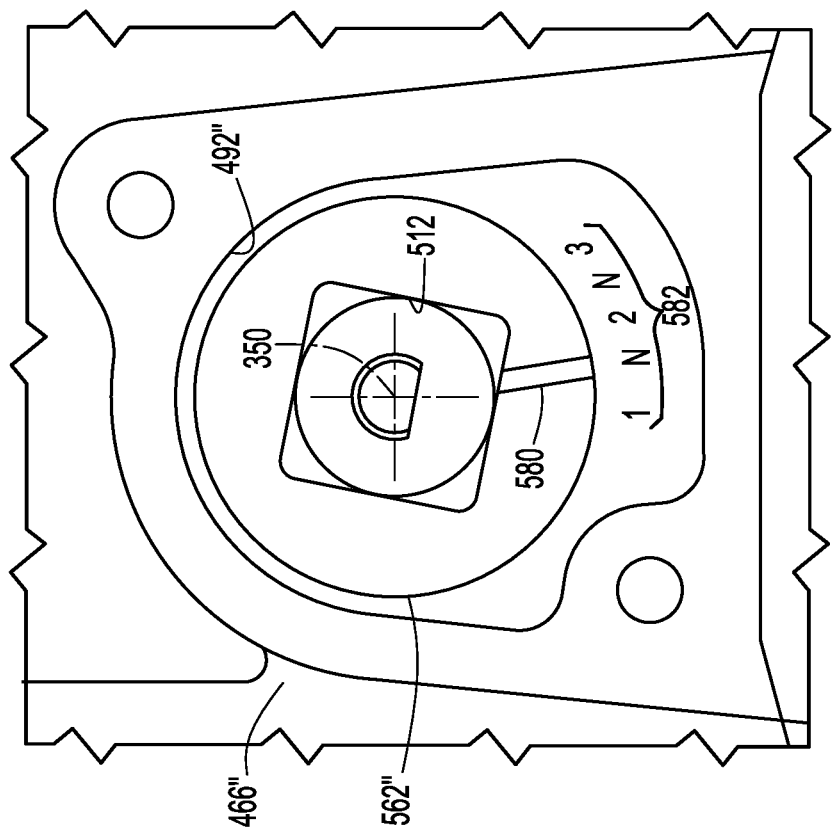
FIG. 19 is a side view of a portion of the axle assembly showing an example of an end of a drive member of the shift mechanism associated with FIGS. 15 and 16.

Referring to FIG. 19, a magnified side view is shown with the sensor 550 removed to reveal the drive member flange 562". The drive member flange 562" may be provided with an indicator mark 580. The indicator mark 580 may provide a visual indication of the rotational position of the drive member 326" and hence may indicate the position of the shift collar 310 in a manner that is visible from outside the shift mechanism housing 466". For example, the shift mechanism housing 466" may include one or more markings 582 that may represent an axial position of the shift collar 310. In the configuration shown, the numbers 1, 2, and 3 represent positions in which the shift collar 310 are engaged with three different drive pinion gears. The letter "N" may represent a neutral position in which the shift collar 310 is not engaged with any of the drive pinion gears. In the example shown, the indicator mark 580 is aligned with a neutral position that is positioned between gear 1 and gear 2.

Operation of the Shift Mechanism

The following discussion of operation of the shift mechanism 32, 32', 32" applies to all shift mechanism configurations previously discussed.

Referring to FIG. 4, the actuator 312 may move the shift collar 310 along the axis 70 between a plurality of positions to selectively couple the shift collar 310 to the transmission 204 or to decouple the shift collar 310 from the transmission 204. For instance, the actuator 312 may move the shift collar 310 along the axis 70 between the first, second, and third positions. The actuator 312 may also move the shift collar 310 along the axis 70 to first and second neutral positions. In the discussion below, reference to connecting or disconnecting a member of the set of drive pinion gears 210 to/from the drive pinion 30 includes direct and indirect connections to and disconnections from the drive pinion 30. For instance, a member of the set of drive pinion gears 210 may be directly coupled to the drive pinion 30 or indirectly connected to the drive pinion 30 such as via the drive pinion extension 90.

In the first position, the shift collar 310 may couple the fourth gear 226 to the drive pinion 30. For example, the teeth of the shift collar gear 344 may mesh with the inner gear teeth 236 of the fourth gear 226. Torque may be transmitted from the rotor 106 to the first gear 220 such as via the rotor output flange 130, from the first gear 220 to the first countershaft gears 270, 270', from the first countershaft gears 270, 270' to the fourth countershaft gears 276, 276' via the first and second countershafts 260, 260', respectively, from the fourth countershaft gears 276, 276' to the fourth gear 226, and from the fourth gear 226 to the drive pinion 30 via the shift collar gear 344 of the shift collar 310. The first gear 220, the second gear 222, and the third gear 224 may be rotatable about the axis 70. Torque may be provided at the first gear ratio in the first position, such as a low-speed gear ratio.

In the first neutral position, the shift collar 310 may not couple any member of the set of drive pinion gears 210 to the drive pinion 30. As such, the teeth of the shift collar gear 344 may be spaced apart from the first gear 220, the second gear 222, the third gear 224, and the fourth gear 226. The teeth of the shift collar gear 344 may be axially positioned between the inner gear teeth 234 of the third gear 224 and the inner gear teeth 236 of the fourth gear 226. As such, the first gear 220, the second gear 222, the third gear 224, and the fourth gear 226 may be rotatable about the axis 70 with respect to the drive pinion 30 when the shift collar 310 is in the first neutral position and torque may not be transmitted between the transmission 204 and the drive pinion 30. The first neutral position may be positioned between the first position and the second position.

In the second position, the shift collar 310 may couple the third gear 224 to the drive pinion 30. For example, the teeth of the shift collar gear 344 may mesh with the inner gear teeth 234 of the third gear 224. Torque may be transmitted from the rotor 106 to the first gear 220 such as via the rotor output flange 130, from the first gear 220 to the first countershaft gears 270, 270', from the first countershaft gears 270, 270' to the third countershaft gears 274, 274' via the first and second countershafts 260, 260', respectively, from the third countershaft gears 274, 274' to the third gear 224, and from the third gear 224 to the drive pinion 30 via the shift collar gear 344 of the shift collar 310. As such, the first gear 220, the second gear 222, and the fourth gear 226 may be rotatable about the axis 70 with respect to the drive pinion 30 when the second gear ratio is provided. Torque may be provided at the second gear ratio in the second position, such as a mid-speed gear ratio.

In the second neutral position, the shift collar 310 may not couple any member of the set of drive pinion gears 210 to the drive pinion 30. As such, the teeth of the shift collar gear 344 may be spaced apart from the first gear 220, the second gear 222, the third gear 224, and the fourth gear 226. The teeth of the shift collar gear 344 may be axially positioned between the inner gear teeth 234 of the third gear 224 and the inner gear teeth 232 of the second gear 222. As such, the first gear 220, the second gear 222, the third gear 224, and the fourth gear 226 may be rotatable about the axis 70 with respect to the drive pinion 30 when the shift collar 310 is in the second neutral position and torque may not be transmitted between the transmission 204 and the drive pinion 30.

The second neutral position may be positioned between the second position and the third position.

In the third position, the shift collar 310 may couple the second gear 222 to the drive pinion 30. For example, the teeth of the shift collar gear 344 may mesh with the inner gear teeth 232 of the second gear 222. Torque may be transmitted from the rotor 106 to the first gear 220 such as via the rotor output flange 130, from the first gear 220 to the first countershaft gears 270, 270', from the first countershaft gears 270, 270' to the second countershaft gears 272, 272' via the first and second countershafts 260, 260', respectively, from the second countershaft gears 272, 272' to the second gear 222, and from the second gear 222 to the drive pinion 30 via the shift collar gear 344 of the shift collar 310. The shift collar gear 344 may not engage the inner gear teeth 234 of the third gear 224 or the inner gear teeth 236 of the fourth gear 226. As such, the first gear 220, the third gear 224, and the fourth gear 226 may be rotatable about the axis 70 with respect to the drive pinion 30 when the third gear ratio is provided. Torque may be provided at the third gear ratio in the third position, such as a high-speed gear ratio.

The present invention may provide a shift mechanism that has a drive member that may allow the shift collar to be actuated independent of the actuator. This may allow the shift collar to be manually actuated when the actuator is inoperative, such as in a situation in which electrical power is not available to the actuator, when the actuator is stuck or partially stuck and is impaired from moving along the axis, or when a system fault exists that intentionally prevents the actuator from operating. The present invention provides a drive member that is accessible from outside the axle assembly to manually adjust or actuate the shift collar to a desired position. This may allow the shift collar to be manually actuated to a neutral position to facilitate towing of the vehicle or to permit the transmission gears to rotate freely. The present invention may also facilitate maintenance of the vehicle and adjustment of the position of the shift collar to facilitate proper functioning of the shift mechanism.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a drive pinion that is rotatable about an axis;
    a transmission that includes a set of drive pinion gears that is spaced apart from the drive pinion and is rotatable about the axis; and
    a shift mechanism that includes:
        a shift collar that is rotatable about the axis with the drive pinion and moveable along the axis with respect to the drive pinion;
        an actuator that is configured to move the shift collar along the axis to selectively connect a member of the set of drive pinion gears to the drive pinion;
        a linkage that is operatively connected to the actuator and the shift collar and is rotatable about an actuator axis, the linkage having a linkage gear; and
        a drive member that is rotatable about a drive member axis, wherein the drive member has a drive member gear that has teeth that mesh with teeth of the linkage gear, wherein the shift collar is moveable along the axis when the actuator rotates the linkage and when the drive member is manually actuated to rotate the linkage.

2. The axle assembly of claim 1 wherein the linkage gear is a sector gear that has teeth that extend away from the actuator axis.

3. The axle assembly of claim 1 wherein the drive member has a drive member engagement feature that is engageable with a tool that is configured to manually actuate the drive member.

4. The axle assembly of claim 3 wherein the drive member gear and the drive member engagement feature are disposed at opposite ends of the drive member.

5. The axle assembly of claim 1 wherein the shift mechanism is received in a shift mechanism housing and the drive member extends through a hole in the shift mechanism housing.

6. The axle assembly of claim 5 wherein the shift mechanism housing defines a bore that extends from the hole, and wherein a cap is receivable in the bore to conceal the drive member.

7. An axle assembly comprising:
    a drive pinion that is rotatable about an axis;
    a transmission that includes a set of drive pinion gears that is spaced apart from the drive pinion and is rotatable about the axis; and
    a shift mechanism that includes:
        a shift collar that is rotatable about the axis with the drive pinion and moveable along the axis with respect to the drive pinion;
        an actuator that is configured to move the shift collar along the axis to selectively connect a member of the set of drive pinion gears to the drive pinion;
        a detent linkage that is coupled to the actuator and is rotatable about an actuator axis;
        a linkage that is coupled to the detent linkage, operatively connected to the shift collar, and is rotatable about the actuator axis; and
        a drive member that is rotatable about the actuator axis with the detent linkage, wherein the shift collar is moveable along the axis when the actuator rotates the linkage and when the drive member is actuated to rotate the linkage.

8. The axle assembly of claim 7 wherein the drive member is received inside the detent linkage.

9. The axle assembly of claim 7 wherein the detent linkage has a detent linkage spline and the drive member has a drive member spline that mates with the detent linkage spline.

10. The axle assembly of claim 9 wherein the drive member has a drive member engagement feature that is configured to be engaged by a tool that is configured to manually actuate the drive member.

11. The axle assembly of claim 10 wherein the drive member spline and the drive member engagement feature are disposed at opposite ends of the drive member.

12. The axle assembly of claim 7 wherein the shift mechanism is received in a shift mechanism housing and the drive member extends through a hole in the shift mechanism housing.

13. The axle assembly of claim 12 wherein the shift mechanism housing defines a bore that extends from the hole, and wherein a cap is receivable in the bore to conceal the drive member.

14. The axle assembly of claim 12 wherein a sensor is coupled to the drive member and generates a signal indicative of a rotational position of the drive member.

15. The axle assembly of claim 14 wherein the sensor is mounted to the shift mechanism housing and is disposed outside the shift mechanism housing.

16. The axle assembly of claim 14 further comprising an adapter that extends from the sensor to the drive member, wherein the adapter is received inside the drive member and the sensor has a shaft that is received inside the adapter.

17. The axle assembly of claim 7 wherein the detent linkage is positioned along the actuator axis closer to the actuator than the linkage is positioned to the actuator.

18. The axle assembly of claim 17 wherein the detent linkage defines a detent linkage hole that receives the linkage.

19. The axle assembly of claim 17 wherein the drive member defines a drive member hole that receives the linkage.

20. The axle assembly of claim 7 wherein the shift mechanism is received in a shift mechanism housing and the drive member has an indicator mark that provides a visual indication of a position of the shift collar from outside the shift mechanism housing.

\* \* \* \* \*